United States Patent
Soldano

(10) Patent No.: US 7,164,591 B2
(45) Date of Patent: Jan. 16, 2007

(54) BRIDGE-LESS BOOST (BLB) POWER FACTOR CORRECTION TOPOLOGY CONTROLLED WITH ONE CYCLE CONTROL

(75) Inventor: Marco Soldano, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/953,344

(22) Filed: Sep. 29, 2004

(65) Prior Publication Data

US 2005/0105311 A1    May 19, 2005

Related U.S. Application Data

(60) Provisional application No. 60/507,901, filed on Oct. 1, 2003.

(51) Int. Cl.
*H02M 7/04* (2006.01)
(52) U.S. Cl. ............................................. 363/89
(58) Field of Classification Search ............... 363/70, 363/89, 126, 127, 44, 84, 125; 323/222, 323/223, 225, 229, 259, 282, 285
See application file for complete search history.

(56) References Cited

U.S. PATENT DOCUMENTS

| | | | |
|---|---|---|---|
| 4,412,277 A | 10/1983 | Mitchell | 363/81 |
| 4,899,271 A | 2/1990 | Seiersen | 363/126 |
| 5,335,163 A | 8/1994 | Seiersen | 363/126 |
| 5,793,624 A * | 8/1998 | Couture et al. | 363/89 |
| 6,370,045 B1 * | 4/2002 | Lurkens | 363/21.12 |
| 6,411,535 B1 | 6/2002 | Roux | |
| 6,456,514 B1 * | 9/2002 | Perreault et al. | 363/89 |
| 6,570,366 B1 * | 5/2003 | Lin et al. | 323/207 |
| 6,611,130 B1 * | 8/2003 | Chang | 323/235 |
| 6,738,274 B1 * | 5/2004 | Prasad et al. | 363/70 |
| 6,853,174 B1 * | 2/2005 | Inn | 323/285 |

FOREIGN PATENT DOCUMENTS

JP    2001-286149    10/2001

OTHER PUBLICATIONS

J.C. Zolper, "Wide Bandgap Semiconductor Microwave Technologies From promise to practice", Dec. 1999, IEEE International Electron Devices meeting, p. 16.1.1.*
*High Efficient PFC-stage without Input Rectification*, Prof. Dr. Manfred Reddig and Dr. Manfred Schlenk, PCIM conference Proceeding 2003.
International Preliminary Report on Patentability issued Apr. 3, 2006.
Guerra, A., "Innovative Input Converter for Compressor Drives for In-Room Air-Conditioning Stage Applications", Oct. 2004, pp. 1-6.

* cited by examiner

*Primary Examiner*—Gary L Laxton
(74) *Attorney, Agent, or Firm*—Ostrolenk, Faber, Gerb & Soffen, LLP

(57) ABSTRACT

The bridgeless boost topology reduces the power dissipation, cost, and size of prior PFC systems by eliminating the intrinsic loss of the input rectifier bridge. Sensing of the input line voltage by the controller is unnecessary. The use of One Cycle Control (also known as Single Cycle Control) allows the Power Factor Correction function to be performed without complex rectification networks to obtain the AC line voltage reference. The use of bi-directional switches makes it possible to control inrush current (the startup over-current due to the charging of the output bulk capacitor), which allows elimination of over-current limiting devices and reduction of the diode surge capability requirements. Moving the boost inductor to the system input adds an additional filtering function, reducing the cost of input EMI filtering.

9 Claims, 26 Drawing Sheets

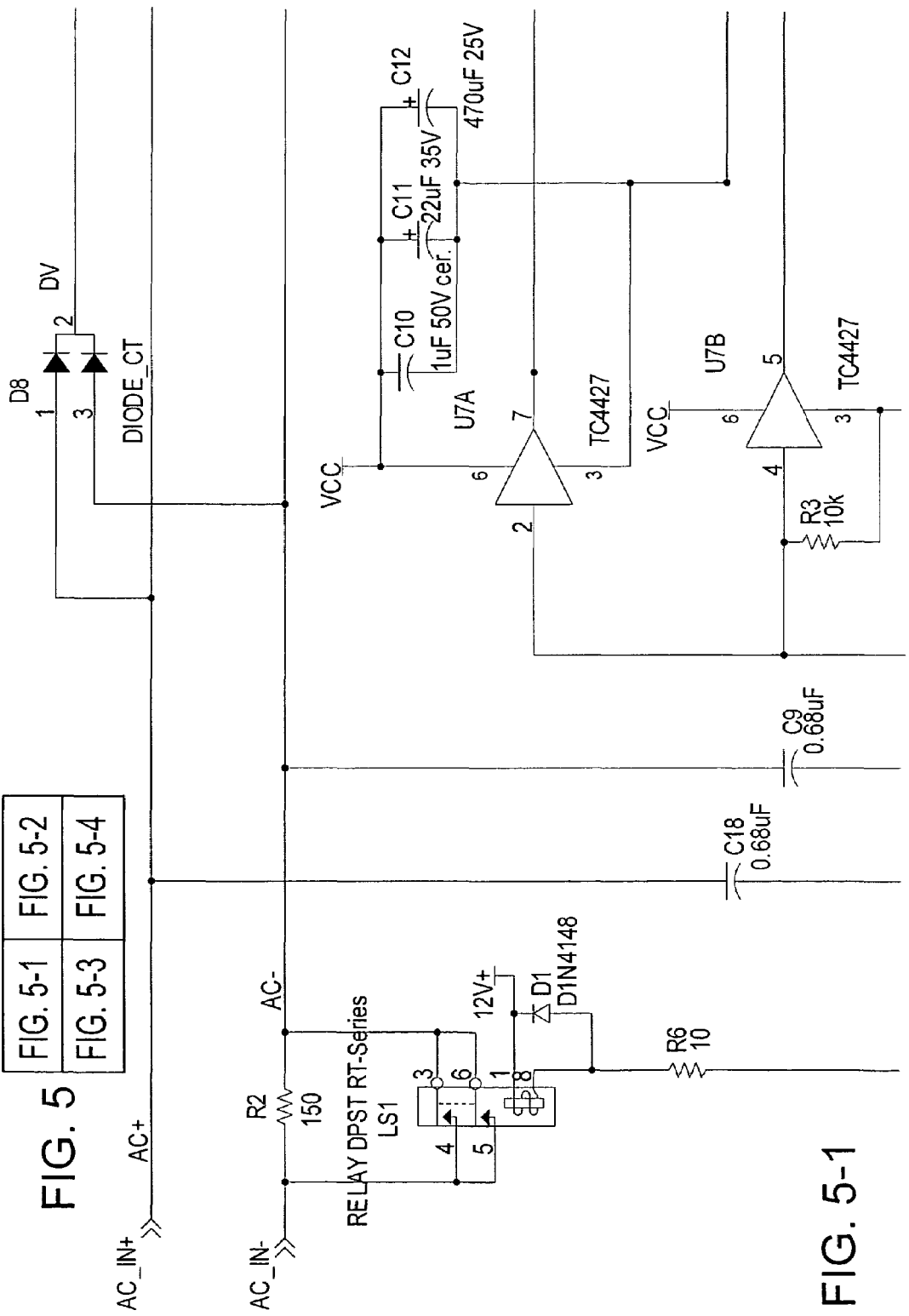

Vcc Under Voltage Lockout Timing

Output Protection Timing

BRIDGE-LESS BOOST (BLB) POWER FACTOR CORRECTION TOPOLOGY CONTROLLED WITH ONE CYCLE CONTROL

CROSS-REFERENCE TO RELATED APPLICATION

This disclosure is based upon and claims priority of U.S. Provisional Patent Application Ser. No. 60/507,901 filed Oct. 1, 2003, incorporated by reference.

BACKGROUND OF THE INVENTION

1. Field of the Invention

The present invention relates to a bridge-less boost (BLB) power factor correction topology, and more particularly to such a circuit controlled with one cycle control and/or comprising bidirectional switches.

2. Description of the Related Art

Power factor correction is required by international standards (EN61000-3-2) to reduce harmonic emissions in AC powered systems.

The most common solution, shown in FIG. 1, uses typically an input rectifier bridge, made of four diodes of appropriate voltage rating followed by a boost switching converter, controlled by a voltage loop and a current loop. The outer voltage loop via diode DV will tend to maintain the output voltage approximately constant. The inner current loop via diode DL (indicated by arrows) will shape the input current to track the instantaneous input voltage.

Typically the input voltage is sensed by the controller PFC PWM to generate a reference signal for the current. The current is also sensed by the control circuit. Thus the input voltage and current will be proportional at all times, generating the desired resistive behavior at the input of the system.

This known circuit has several disadvantages. The path of the current goes through three diodes in series (two in the input bridge plus the output boost diode DL) causing high conduction losses especially at high current levels. The inrush current control (NTC device and relay) also affects performance. The PFC PWM controller usually must sense the rectified input line voltage, as well as the output voltage and the instantaneous inductor current, in order to be able to achieve both power factor correction and load regulation. Moreover, this circuit has redundant rectification, by the input bridge on the one hand, and by the boost inductor L on the other.

FIG. 7 shows a prior art PFC topology as disclosed in U.S. Pat. No. 4,412,277, incorporated by reference, which uses a traditional control technique using an analog multiplier. This topology is undesirable at least because the controlled switches cannot be driven at the same time, but need to have separate gate drives, properly out of phase.

FIG. 8 shows another prior single phase dual boost topology. A disadvantage of this circuit is the reverse recovery of the high side switch, which would make the implementation impractical. This problem is overcome in the present bridgeless solution wherein a hyperfast boost diode may be used. The prior method is a "passive PFC" and requires a resonant or snubbing network to achieve results. The present bridgeless PFC is an active method and can utilize either hard or soft switching.

Also of interest are U.S. Pat. No. 5,335,163; U.S. Pat. No. 4,899,271; EP 1 198 058 A1; and High Efficient PFC-stage without Input Rectification, Prof. Dr. Manfred Reddig and Dr. Manfred Schlenk, PCIM Conference Proceeding 2003; all of whose disclosures are incorporated by reference.

SUMMARY OF THE INVENTION

According to one aspect of the invention, the bridgeless boost dramatically reduces the power dissipation in prior PFC systems by eliminating the intrinsic loss of the input rectifier bridge. At the same time it allows reduction of the size of the system and therefore its total cost.

Previous solutions implementing similar topologies required sensing of the input line voltage for the controller to be able to operate correctly. According to another aspect of the invention, the use of One Cycle Control (also known as Single Cycle Control) allows the Power Factor Correction function to be performed without additional complex rectification networks to obtain the AC line voltage reference, simplifying the implementation of the circuit.

According to a third aspect, by using bi-directional switches as S1 and S2, is also possible to completely control the inrush current (the startup over-current due to the charging of the output bulk capacitor) by adding an appropriate reset network for the input-boost choke. This allows elimination of the over-current limiting devices (such as the NTC and relay and the bypass diode in FIG. 1) and reduction of the surge capability requirements of the boost diodes, allowing in turn the use of smaller and more efficient parts.

According to a fourth aspect, moving the boost inductor to the system input performs an additional filtering function, reducing the cost of the input EMI filter, usually present at the input of the system.

Other features and advantages of the present invention will become apparent from the following description of the invention which refers to the accompanying drawings.

Figure 22:
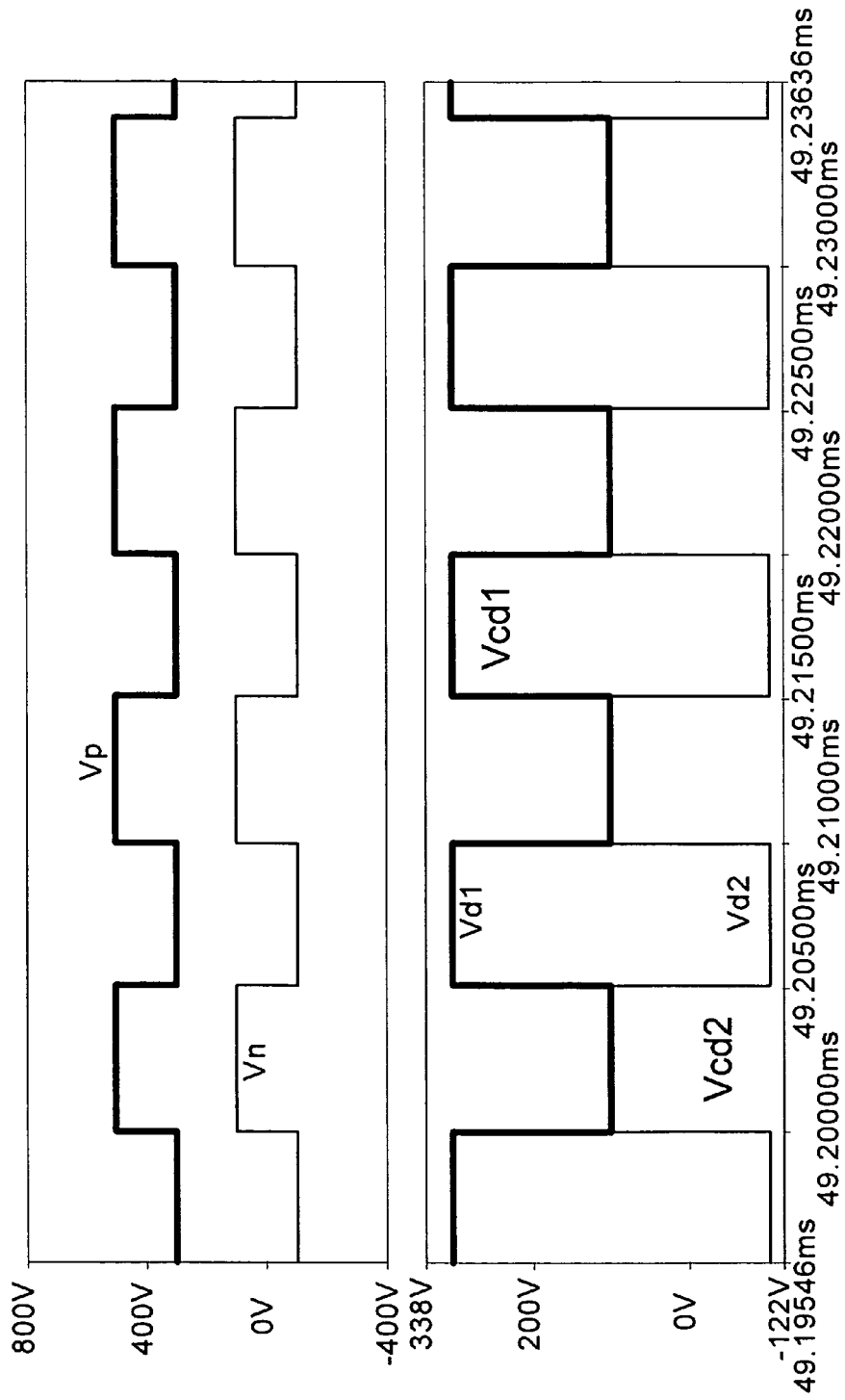

Simulation results of common mode noise are shown in FIG. 22.

Figure 23:
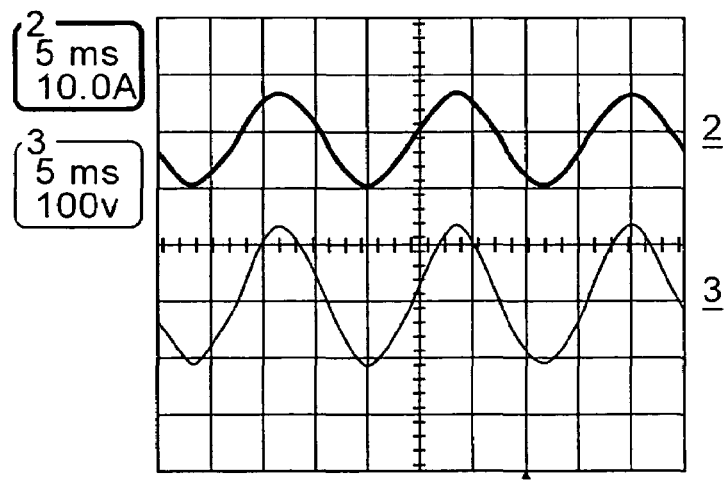

Input voltage and current waveforms in a bridgeless PFC are shown in FIG. 23.

Figure 24:
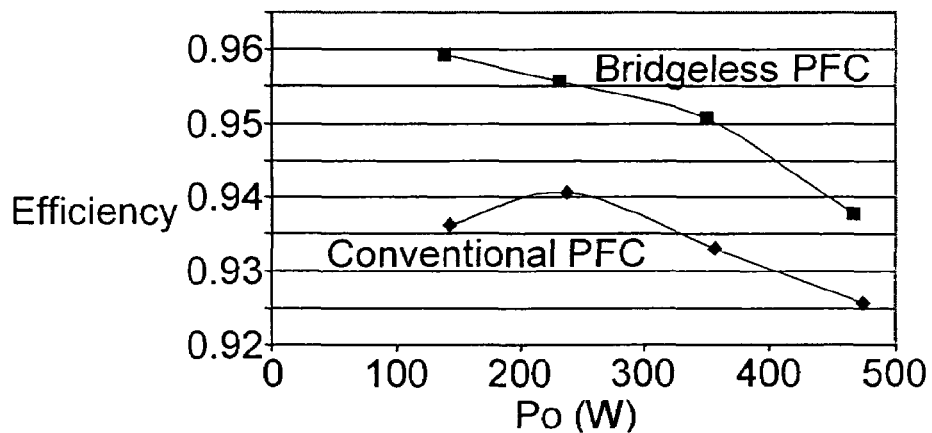

An efficiency comparison between a conventional PFC and a bridgeless PFC is shown in FIG. 24.

Figure 25:
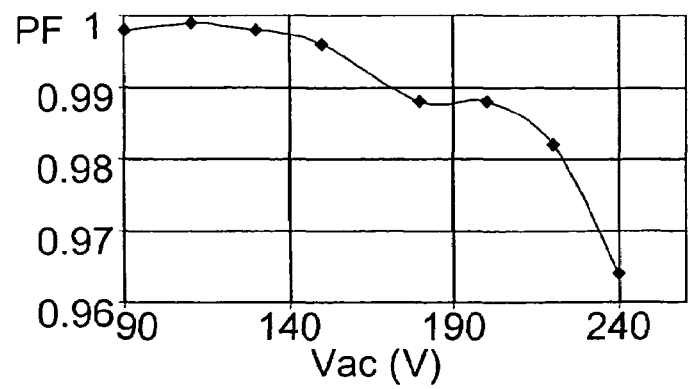

The power factor of a bridgeless PFC at full output power and varying input line voltage is shown in FIG. 25.

Figure 26:
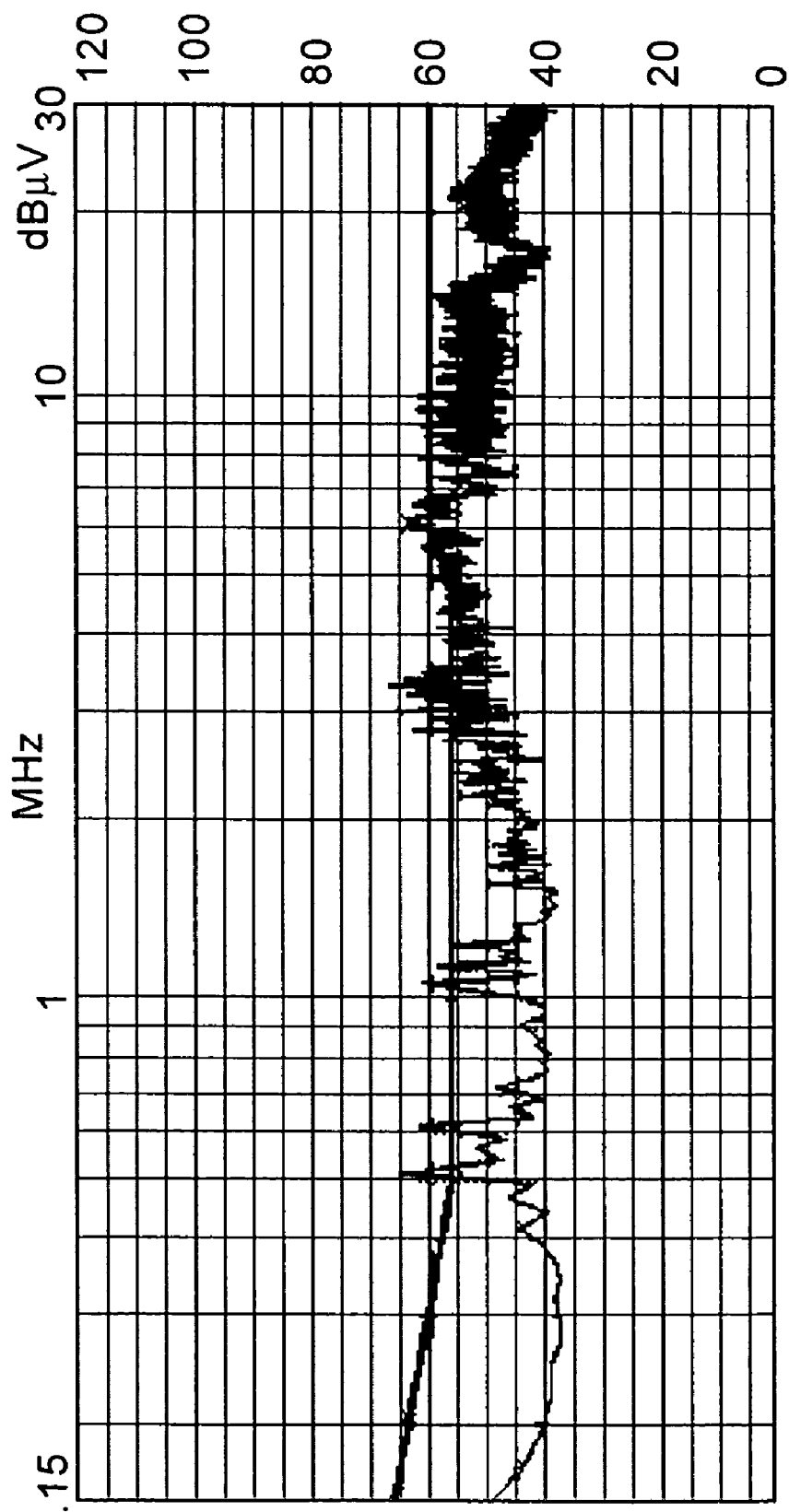
Figure 27:
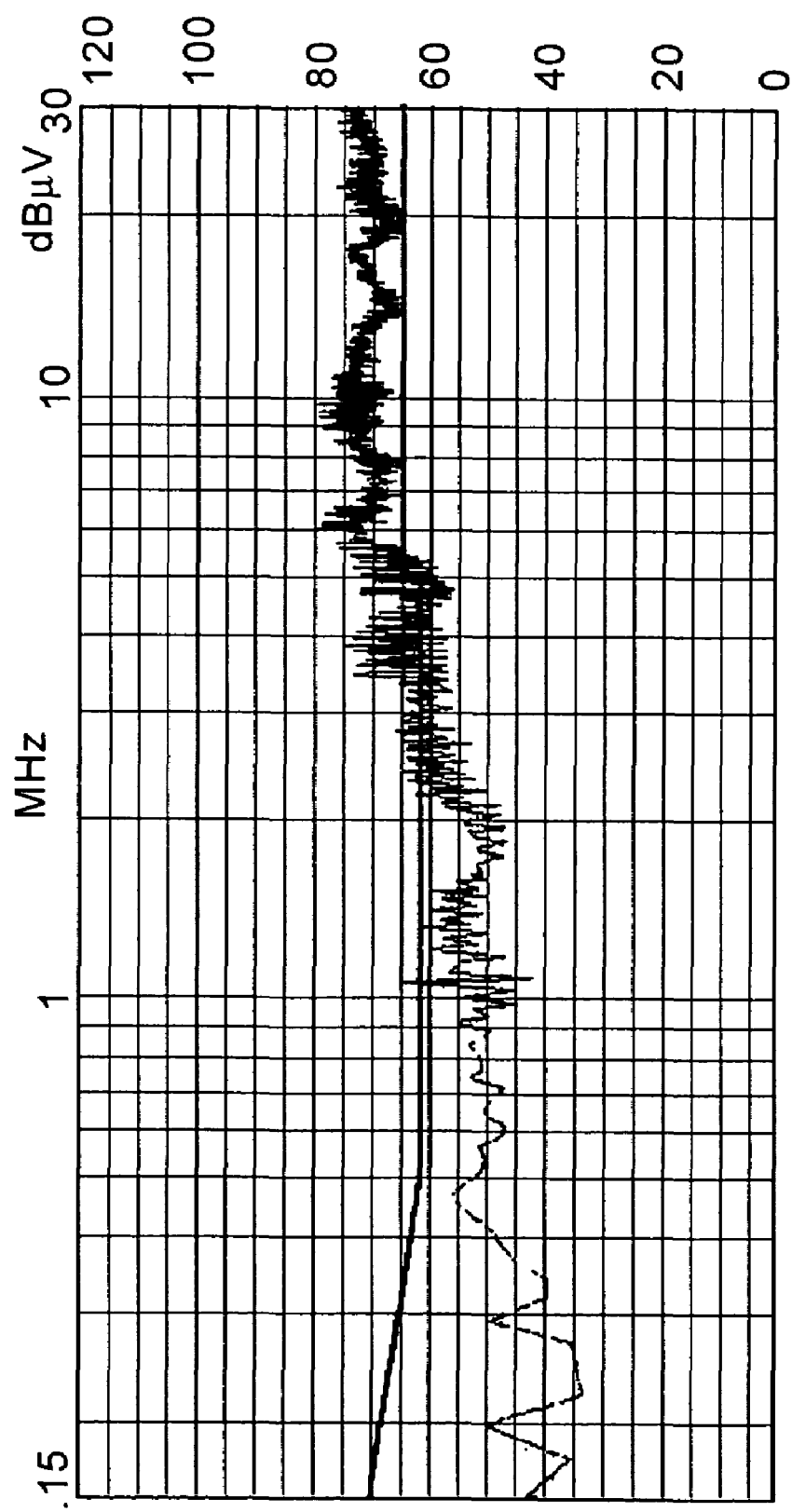

EMI noise in a bridgeless PFC and a conventional PFC circuit are compared in FIG. 26 and FIG. 27.

Figure 28:
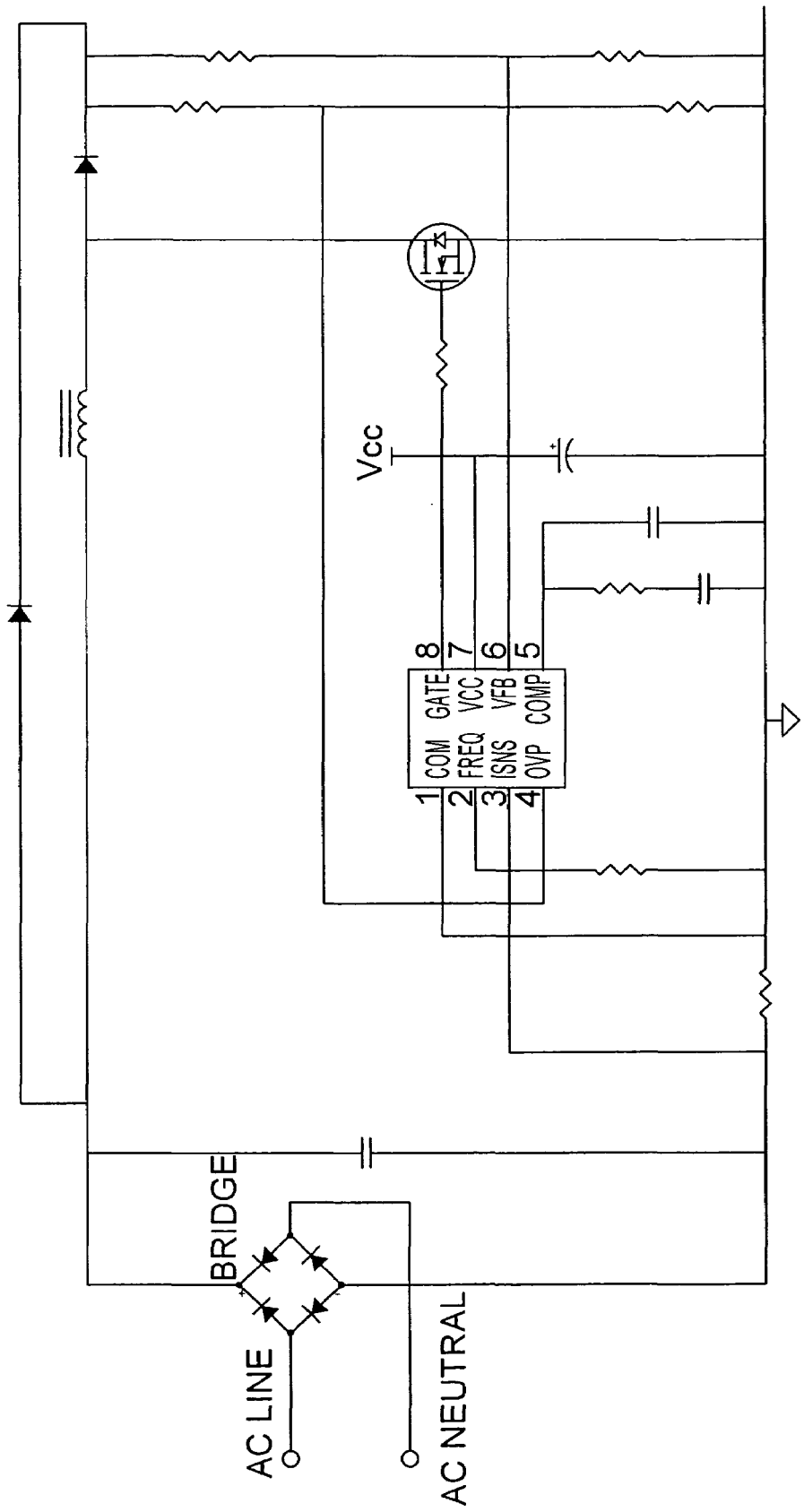

FIG. 28 is a block diagram showing application of a proposed IC for use in a PFC circuit.

Figure 29:
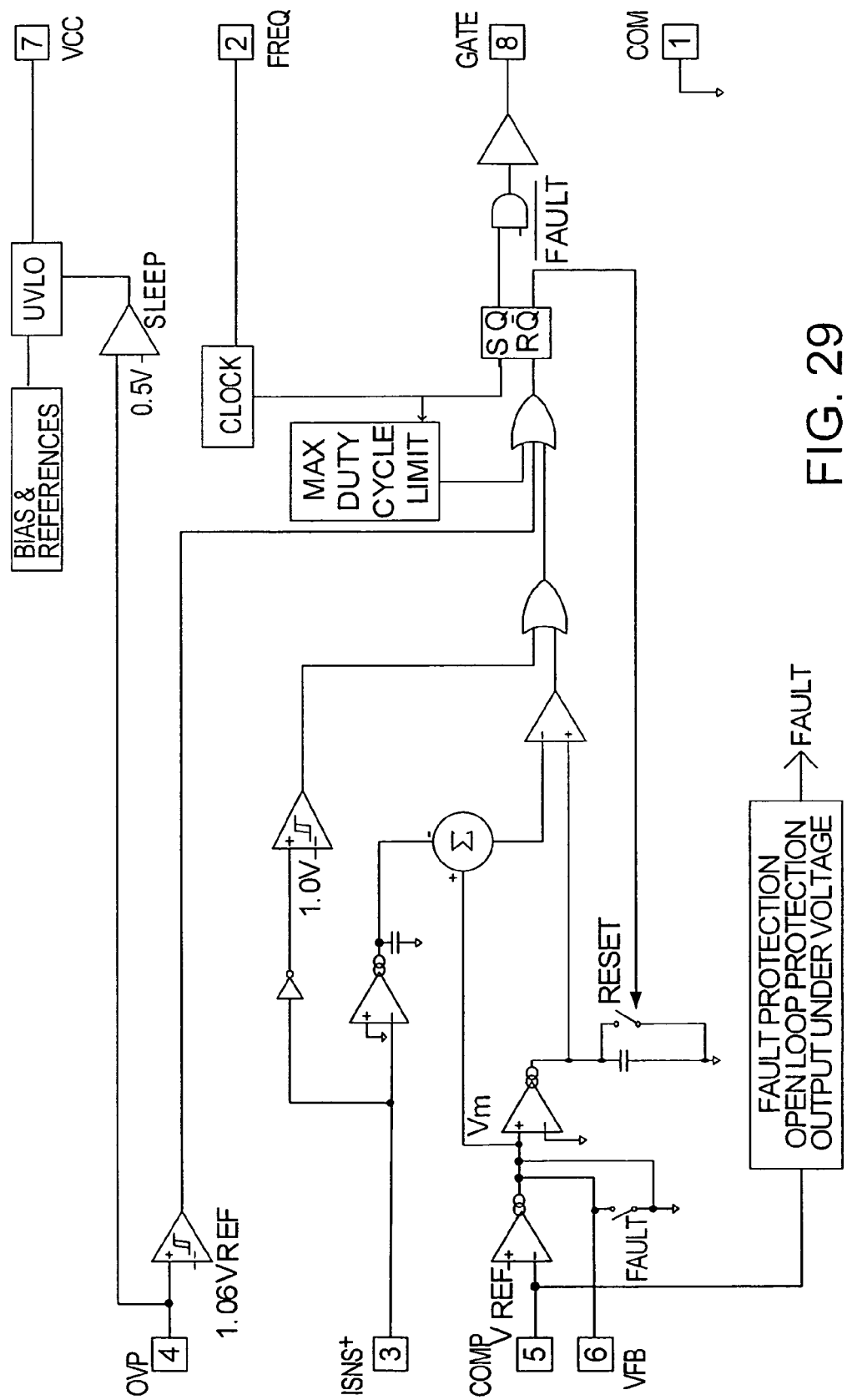

FIG. 29 is a block diagram of the IC in FIG. 28.

Figure 30:
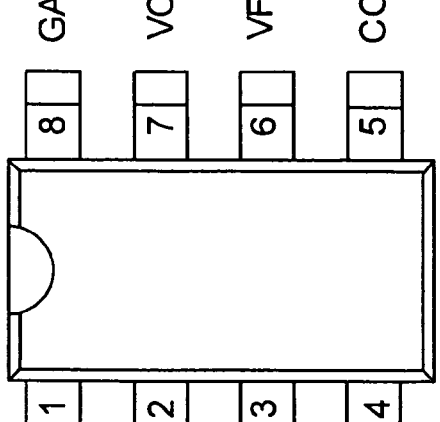

FIG. 30 is a chart showing the lead assignments and definitions in the IC.

Figure 31:
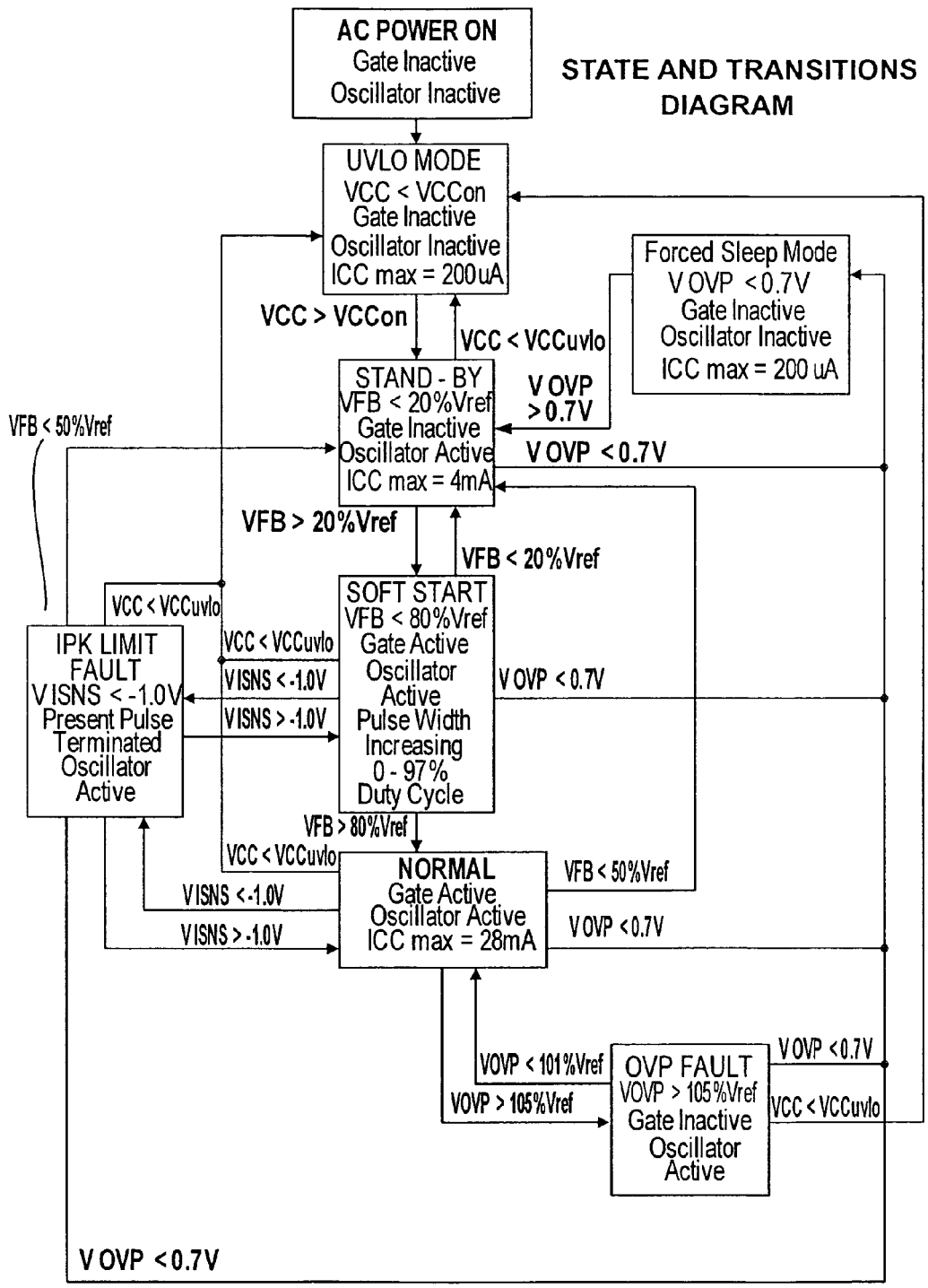

FIG. 31 is a flow diagram showing the states of operation of the IC and the transitions therebetween.

Figure 32:
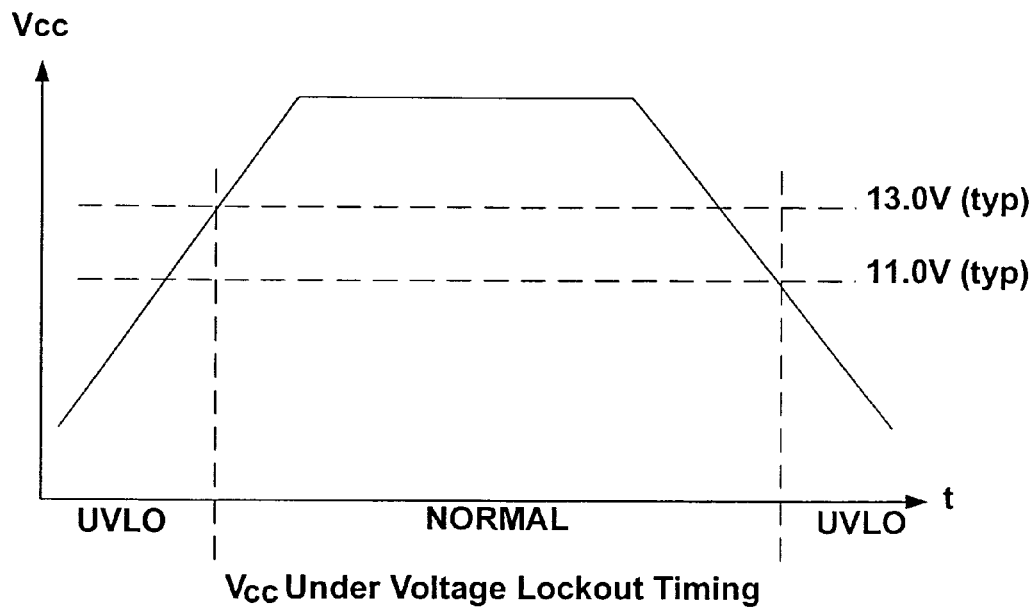

FIG. 32 is a timing diagram of the Vcc UVLO mode of the IC.

Figure 33:
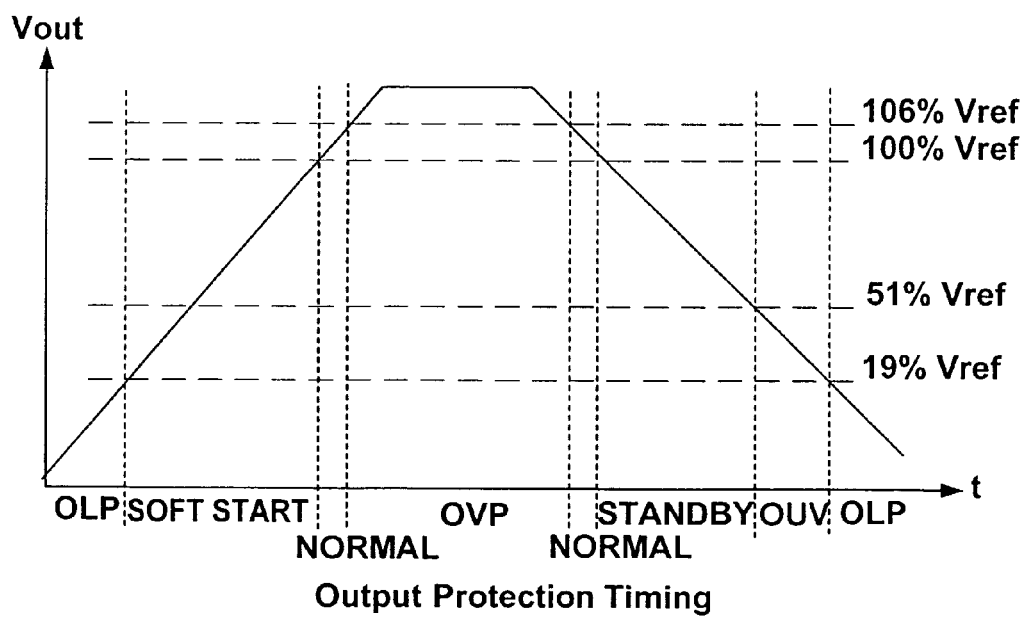

FIG. 33 is a timing diagram of the OLP, Soft Start, Normal, OVP, Standby and OUP modes in the IC.

DESCRIPTION OF EMBODIMENTS OF THE INVENTION

I. The Proposed Circuit

The proposed circuit completely removes the input bridge, replacing its function with two boost diodes and two boost switches. The two boost switches are controlled with a closed loop using the One Cycle Control (OCC) a/k/a Single Cycle Control (SCC) technique.

The boost inductor(s) of the prior circuit are moved to a position before the rectifier function and can be a single inductor or be split into two inductors (as shown), one on each of the two input wires.

Figure 2:
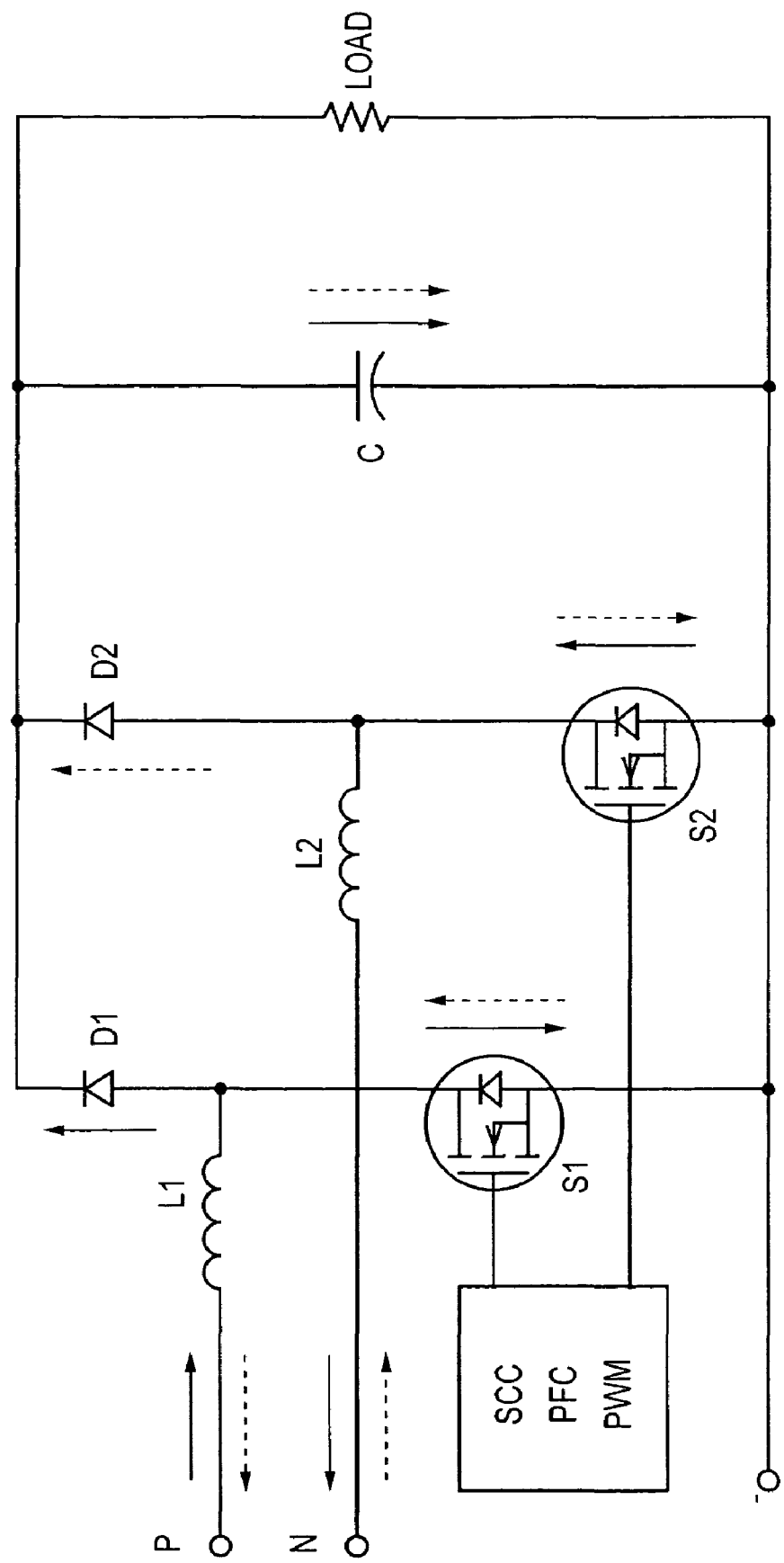
FIG. 2 shows a simplified circuit diagram of a bridgeless boost PFC circuit according to an embodiment of the invention.

A simplified circuit diagram is shown in FIG. 2. The circuit is composed of two boost inductors L1, L2 working in parallel. There may be a common core (not shown). Only one will be effectively active (boosting) at a time. During the positive part of the input sinusoid (indicated by solid arrows), the gate of MOSFET S1 is driven high and current flows through the boost inductor L1, which thereby will be charged. The current path will be closed through the MOSFET S2 body diode (or by turning on S2 as well). When S1 then turns off, energy in L1 is released and its output current discharges into the output capacitor C and the load through D1 (and again the loop is closed through S2).

In the negative part of the AC input cycle, current will flow as per the dashed arrows in FIG. 2. S2 will charge L2. When S2 turns off, D2 will discharge L2 while the body diode of S1 will close the loop, possibly with S1 being turned on as well. As a result only one switch at the time is required to operate. However, it is possible to drive the two switches simultaneously (as long as a body diode is present to recirculate the current when needed as described above).

Figure 3:
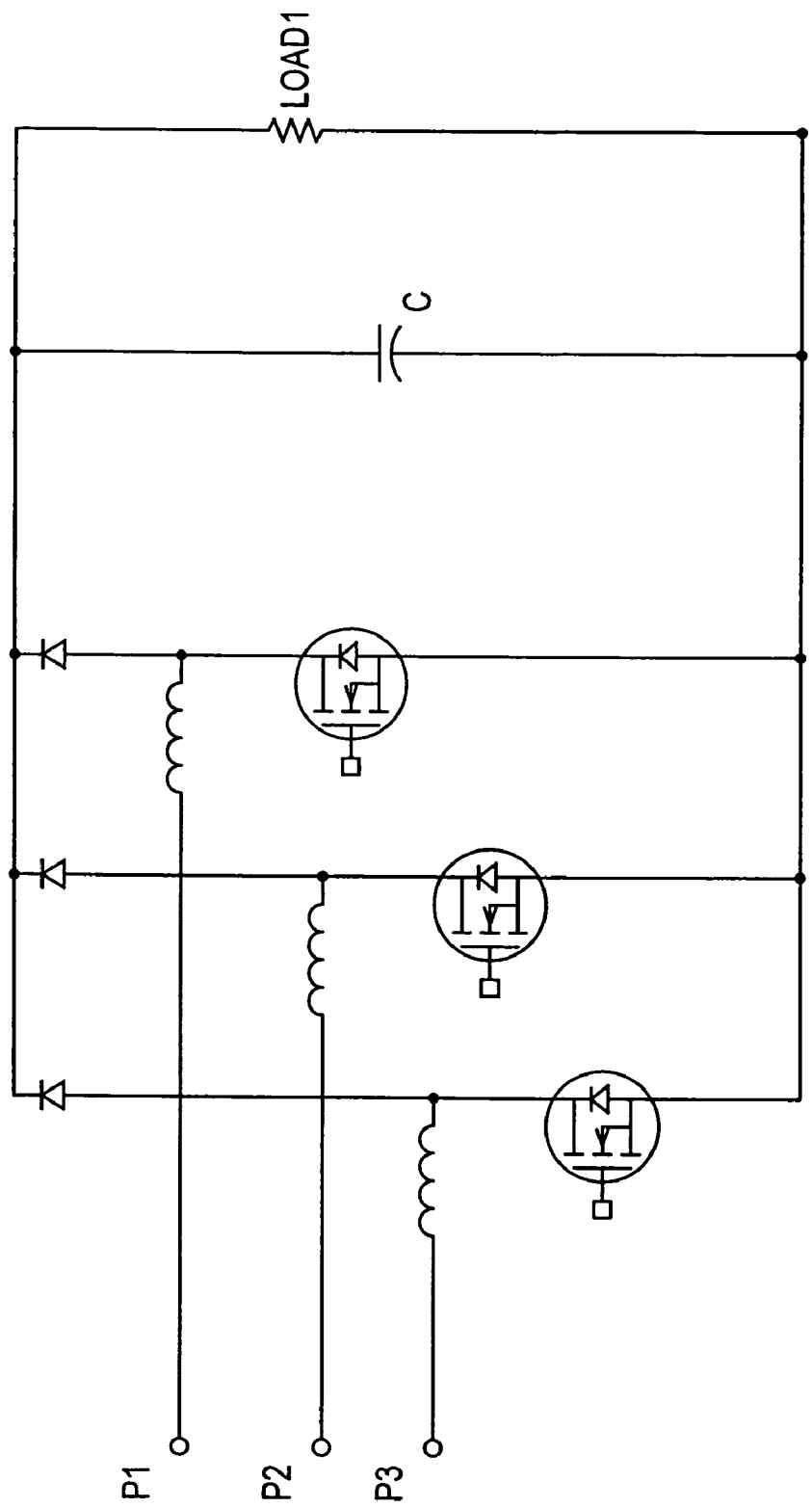
FIG. 3 shows a multi-phase implementation of a bridgeless boost PFC circuit according to an embodiment of the invention.

The same solution can be applied to multi-phase AC input systems, by increasing the number of phases. A multi-phase implementation is shown in FIG. 3. The boost diodes should be fast, in order to reduce switching losses.

Figure 4:
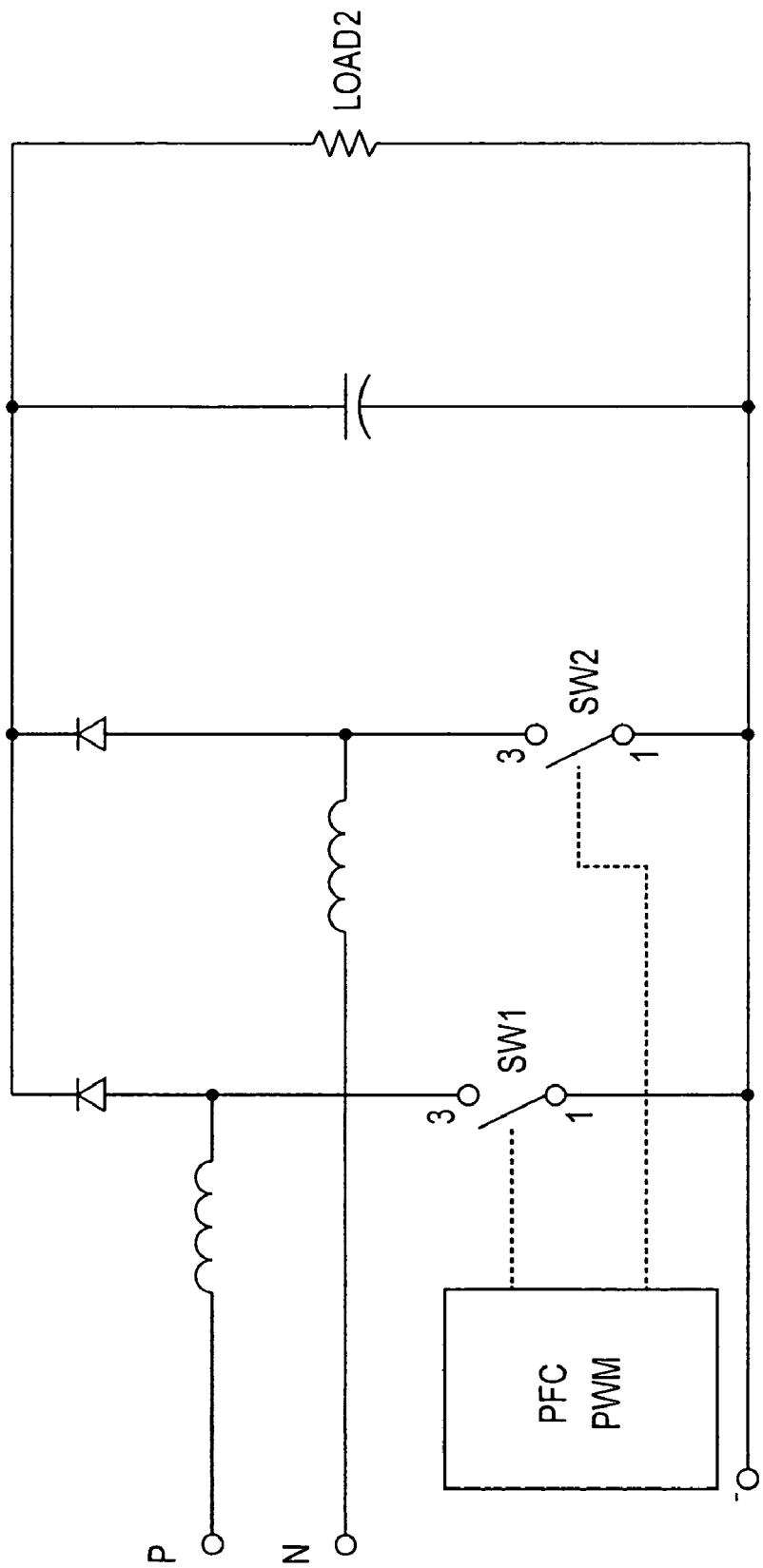
FIG. 4 schematically shows an implementation of a bridgeless boost PFC circuit according to an embodiment of the invention using bi-directional switches such as bidirectional MOSFETs or GaN devices.

FIG. 4 schematically shows an implementation using bi-directional switches such as bidirectional MOSFETs or GaN devices. When a bi-directional switch is used (a switch capable of blocking or conducting in both directions) in place of the MOSFETs S1 and S2, it is also possible to control the inrush current of the system and allow a controlled start-up (soft-start) and an efficient power stand-by mode.

Figure 9:
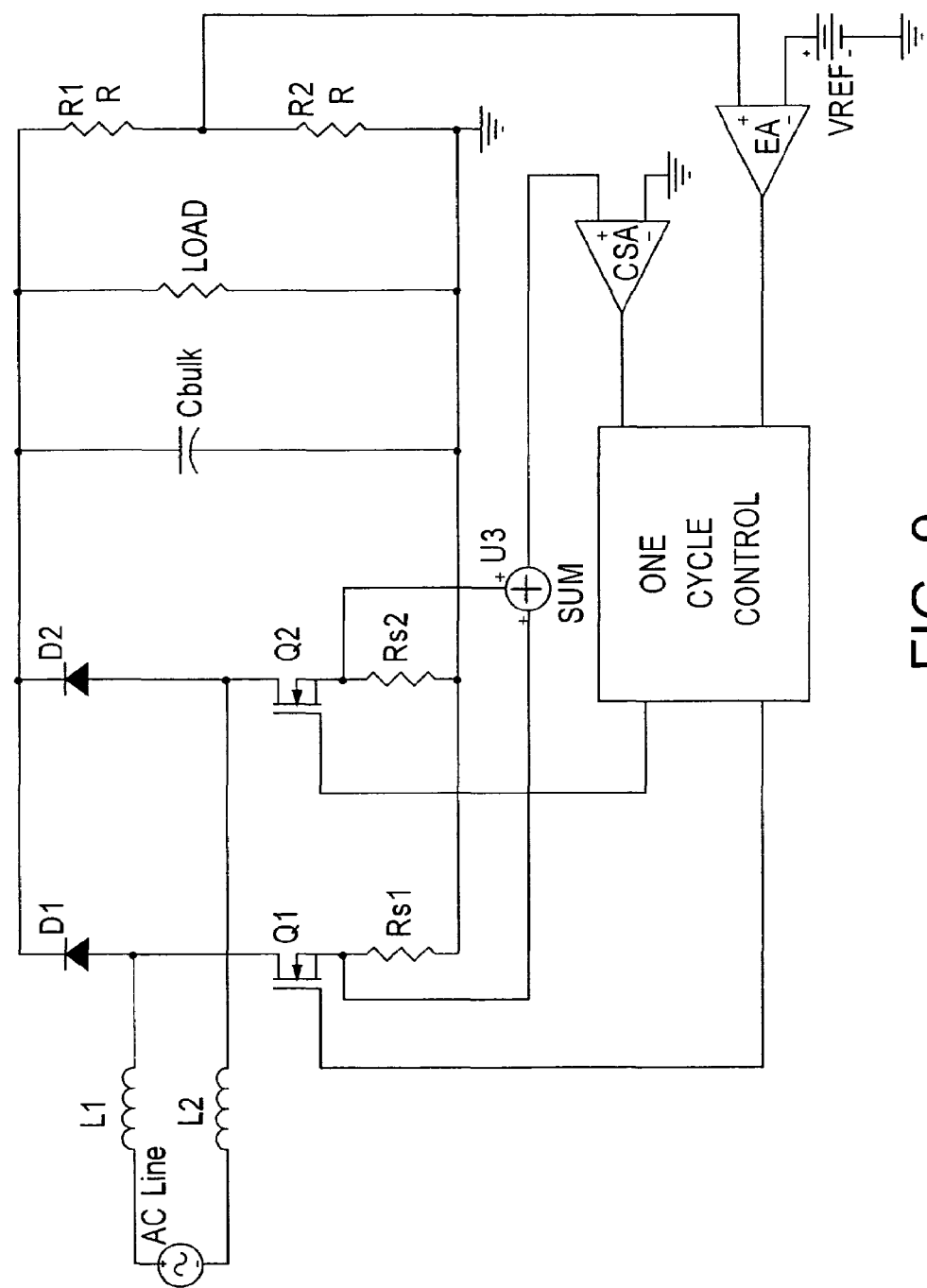
FIG. 9 shows another bridgeless boost PFC circuit with one cycle control according to an embodiment of the invention.

FIG. 9 shows another bridgeless boost PFC circuit with one cycle control according to an embodiment of the invention. The current through switches Q1 and Q2 are sensed via sense resistors Rs1 and Rs2, summed by an adder U3 and supplied to a current sense amplifier CSA. The output voltage across LOAD is sensed by a voltage divider R1, R2 and supplied to an error amplifier EA and compared with a reference voltage $V_{REF}$. The respective outputs of CSA and EA are supplied to the one cycle control circuit, which controls Q1 and Q2 to control their respective currents for power factor correction.

Figure 7:
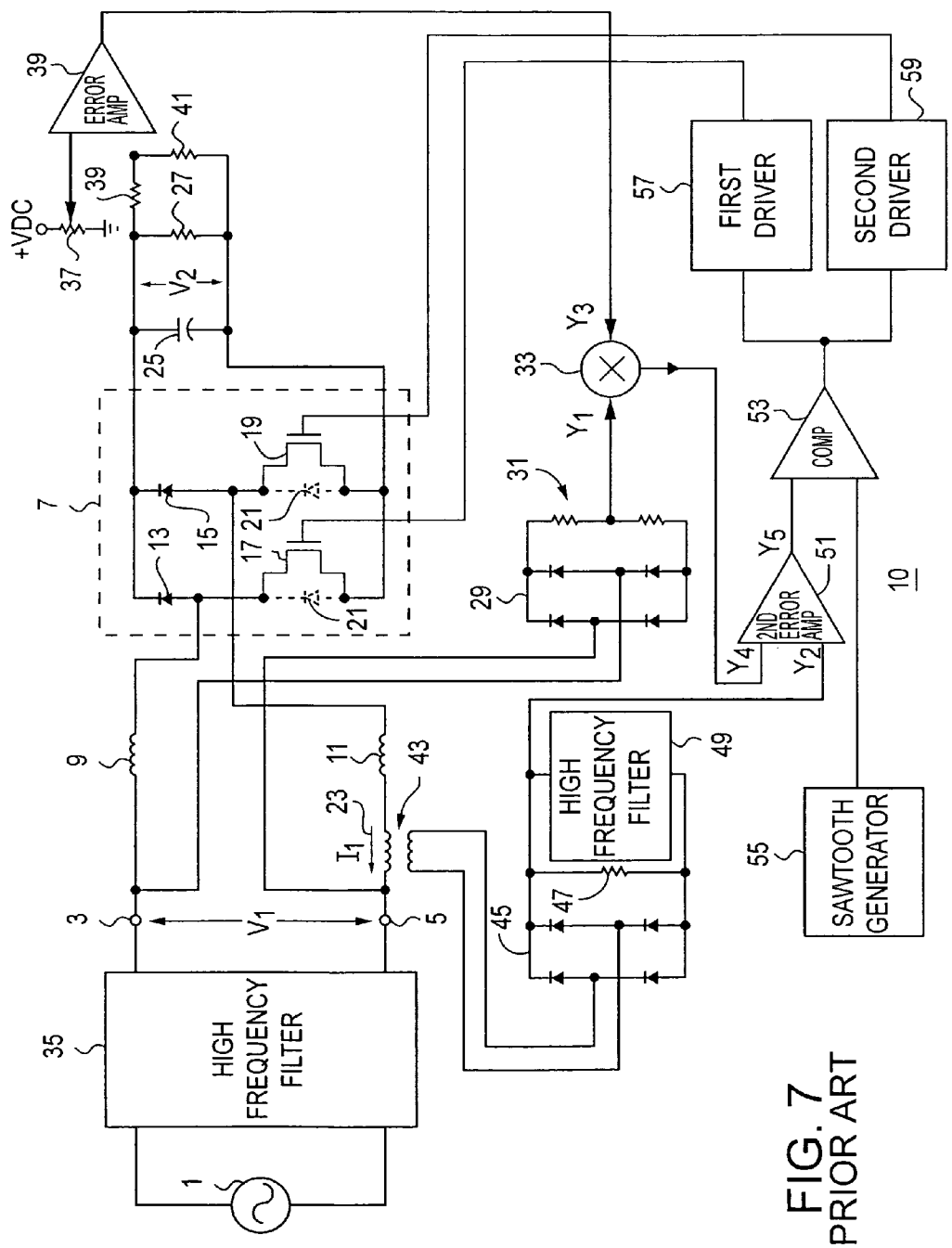
FIG. 7 shows a prior art PFC topology using an analog multiplier for the PFC function.
Figure 8:
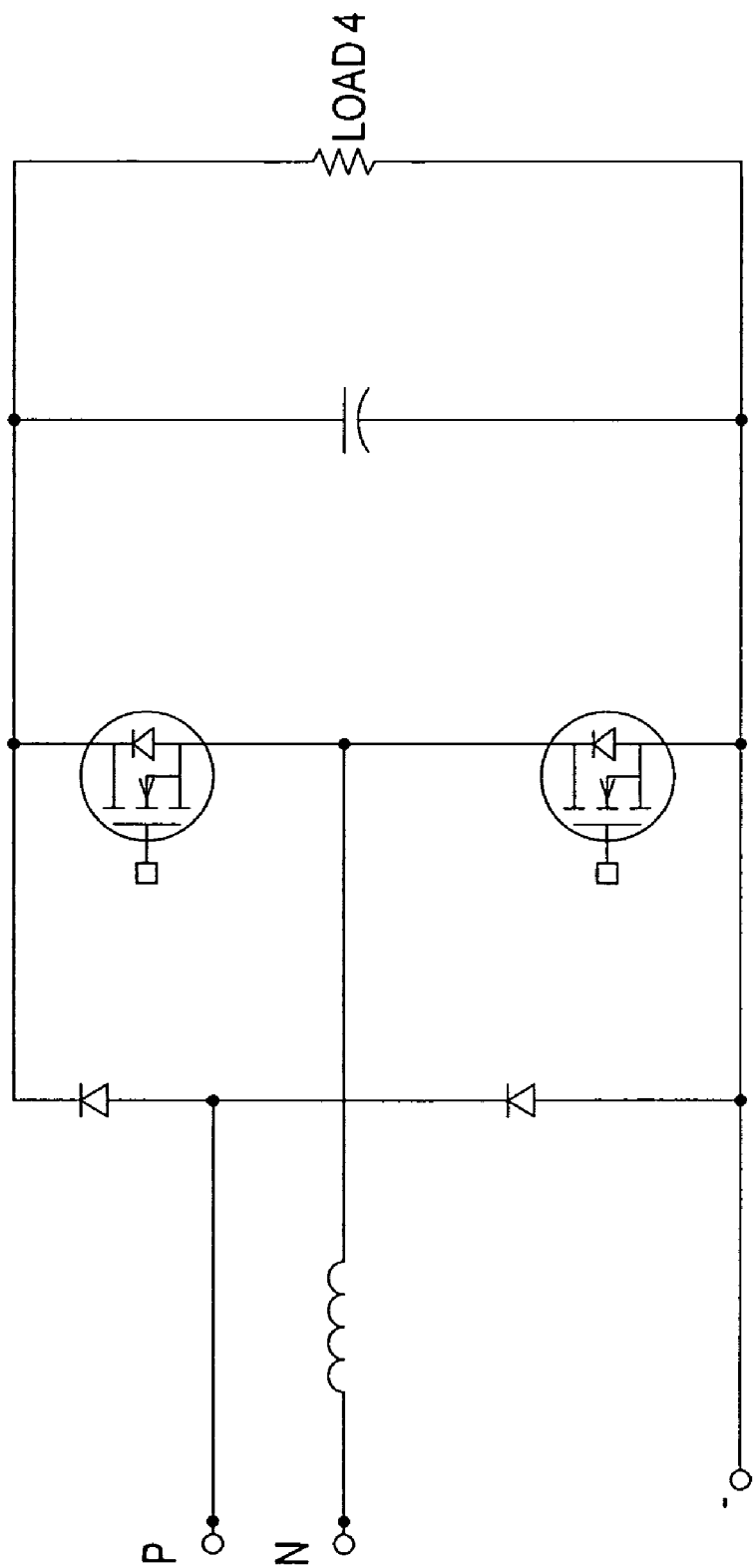
FIG. 8 shows another prior art single phase dual boost topology.

Compared to the prior art, this OCC implementation of the BLB introduces at least two important simplifications:

1) There is no need to sense the input voltage (VI in FIG. 7 between points 3 and 5). In the BLB case the input voltage is completely floating with reference to ground. Circuits 29 and 31 are therefore not required.

2) There is no need to sense the inductor current (ref. 23). The switches' current is sufficient for the operation of the circuit. Therefore a simple shunt referenced to ground can be used to sense current and achieve power factor correction. The disadvantage of sensing the inductor current is that that node is floating (ref. 43) and the current contains the fundamental frequency of the AC mains (50 or 60 Hz). This means that the current transformer needs to be designed to withstand the low frequency without saturating (a large and expensive component). The OCC implementation overcomes this limitation. Other suitable current sensing schemes may be used as well for OCC.

Figure 1:
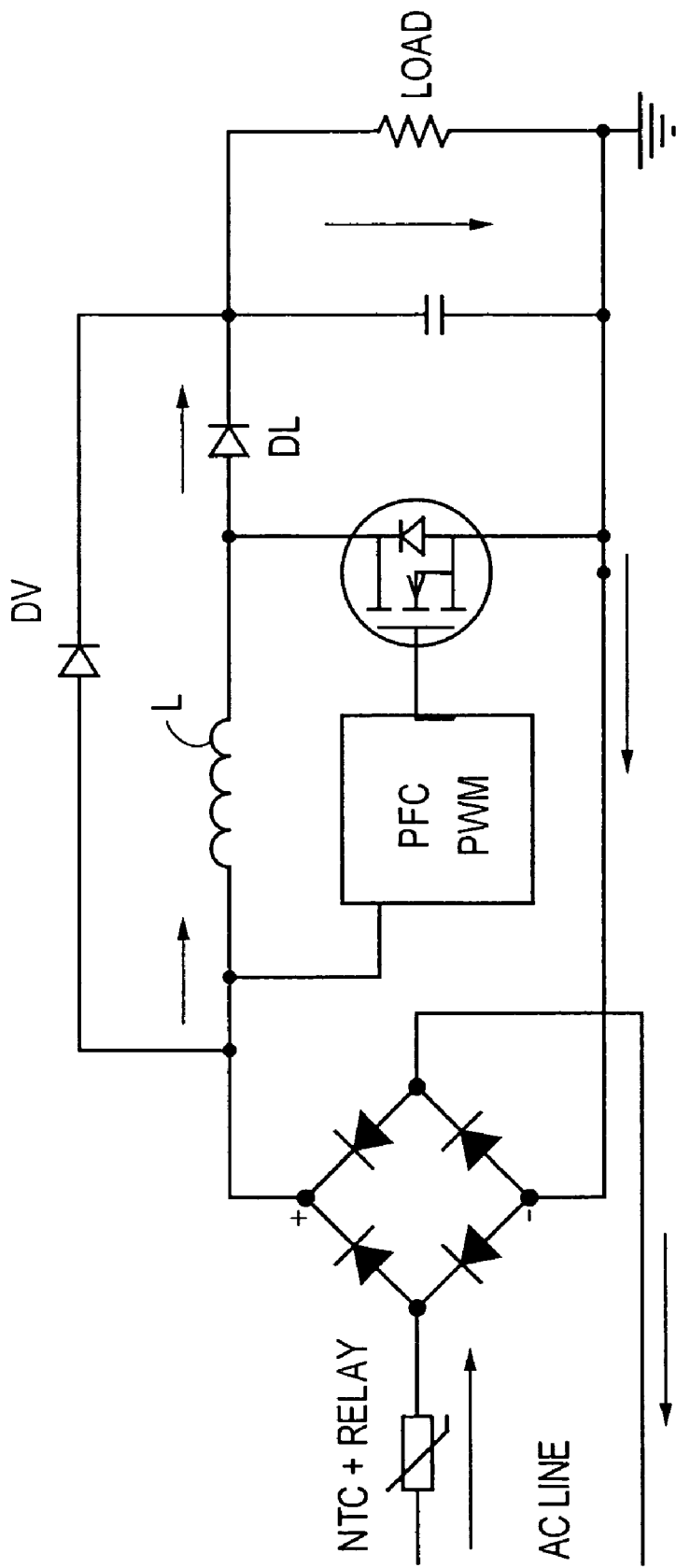
FIG. 1 shows a conventional PFC circuit having an input rectifier bridge, followed by a boost switching converter, controlled by a voltage loop and a current loop.
Figures 2, 5:
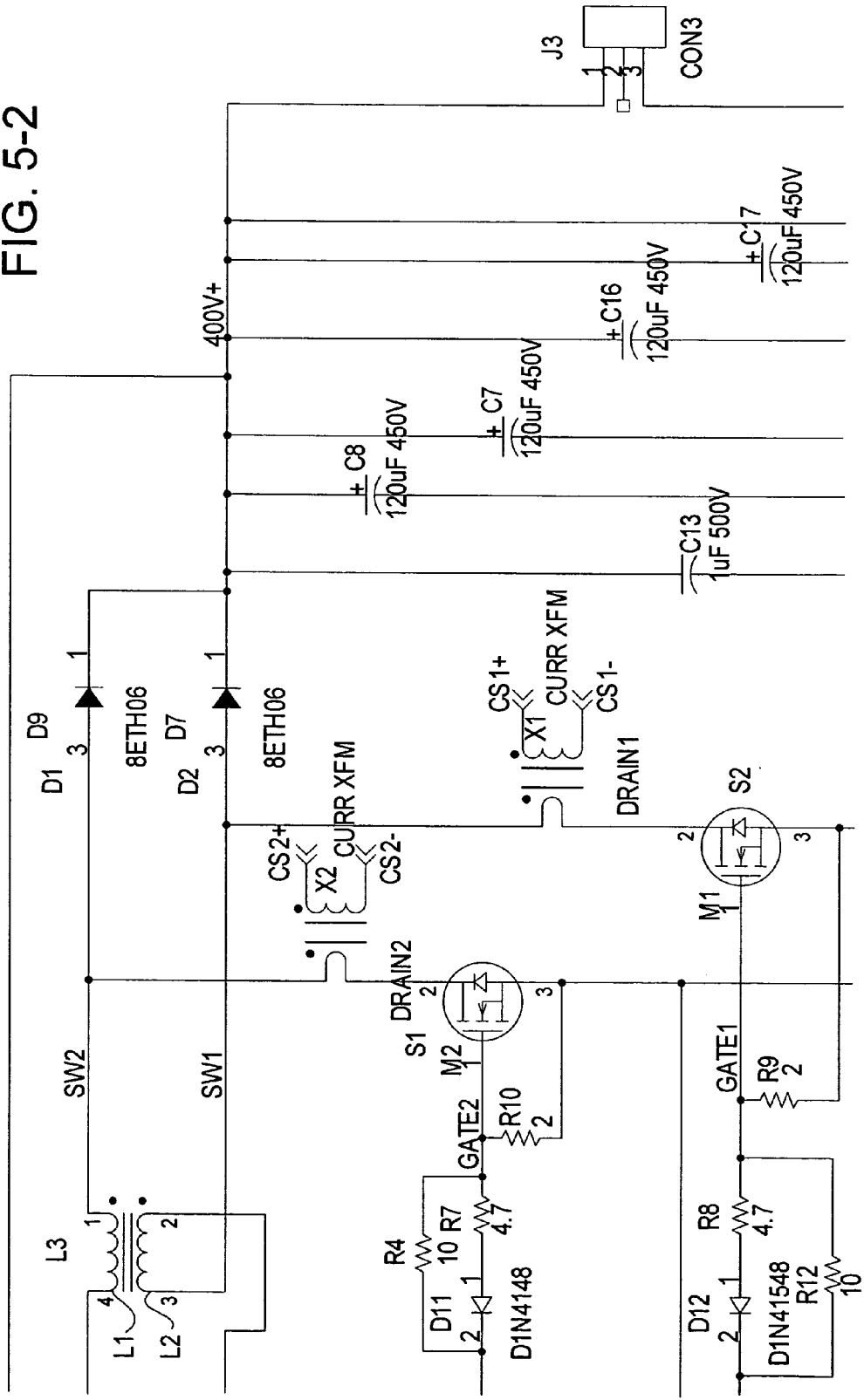
FIG. 5 shows a practical implementation of a bridgeless boost PFC circuit according to an embodiment of the invention.
Figures 3, 5:
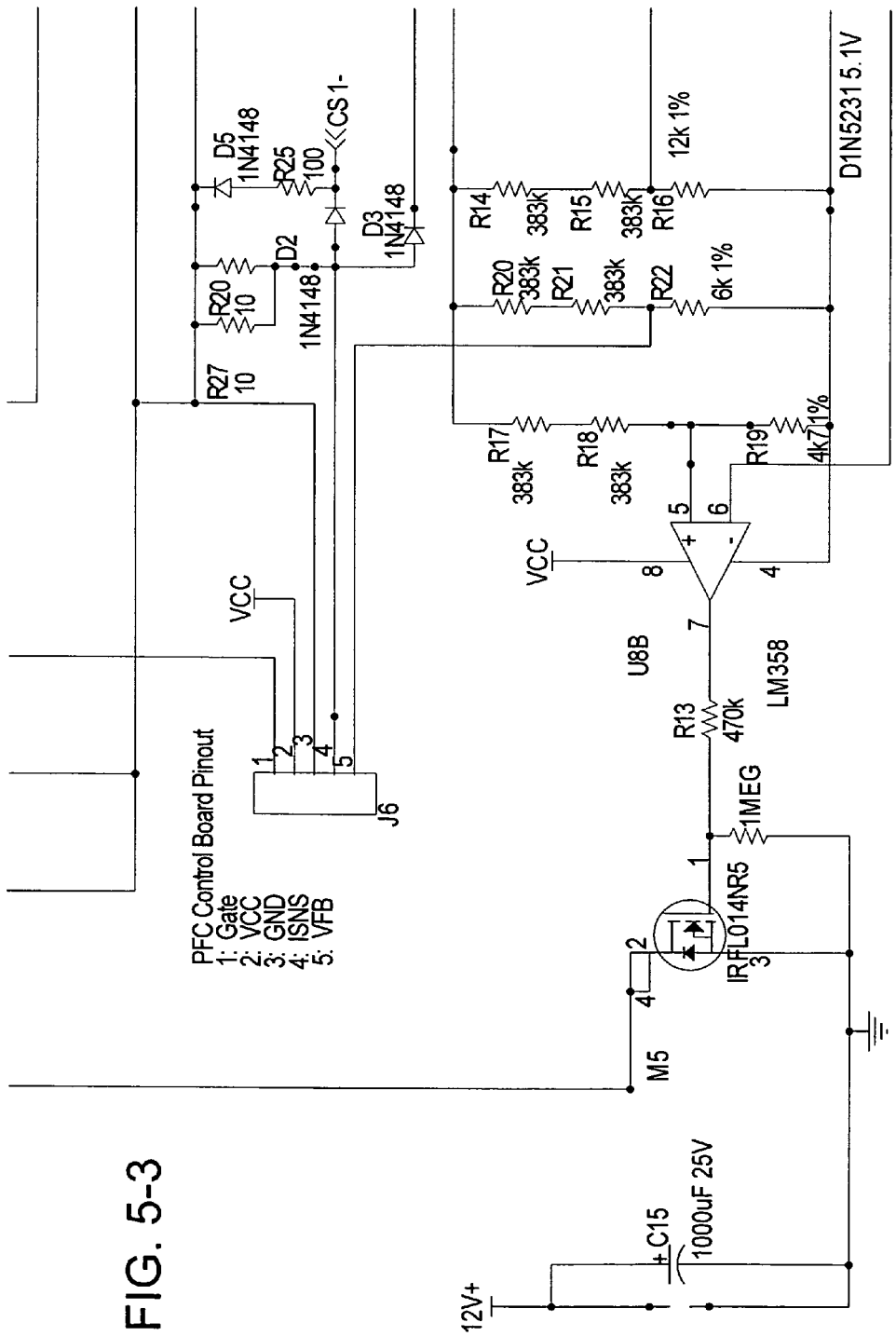
Figures 4, 5:
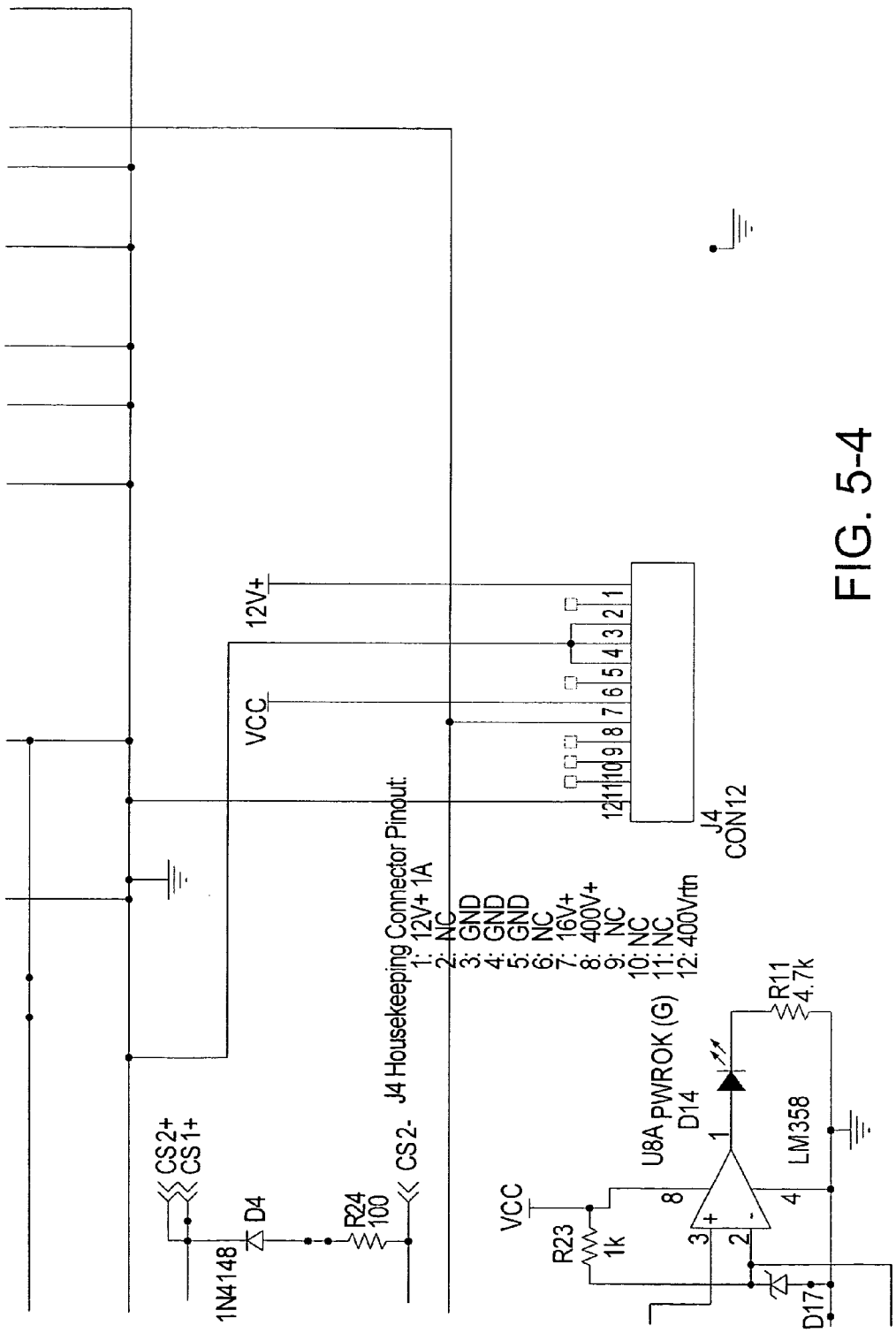
Figure 6:
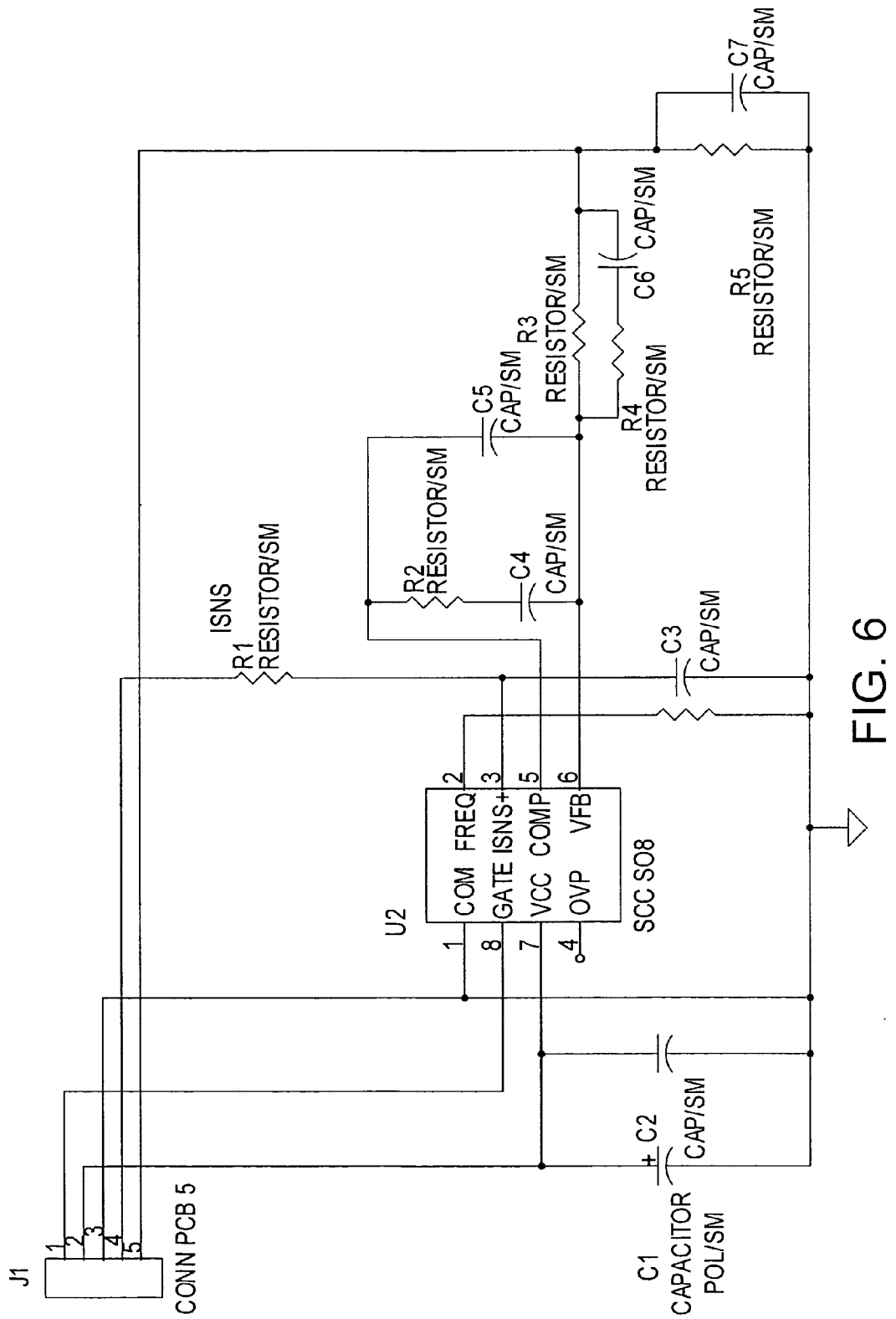
FIG. 6 shows an OCC control board used with the circuit of FIG. 5.

The implementation with unidirectional switches has been built and tested giving positive results. FIG. 5 shows a practical implementation. FIG. 6 shows the OCC control board. Components corresponding to those in FIGS. 1 and 2 are indicated. Connector J1 on the OCC control board of FIG. 6 connects with connection J6 in the circuit of FIG. 5. The SCC chip 42 will be discussed in more detail below.

II. Bridgeless PFC Implementation Using One Cycle Control Technique

A. Introduction

Single switch CCM (continuous conduction mode) PFC (power factor correction) is the most widely used topology for PFC applications because of its simplicity and smaller EMI filter size. Due to its high conduction loss and switching loss, this circuit has low efficiency at low input line voltages. With the development of the super junction MOSFET and the SiC Schottky diode, the switching loss of the PFC circuit is dramatically improved.

However, the circuit still suffers from the forward voltage drop of the rectifier bridge causing high conduction loss, especially at low input line voltages. To reduce the rectifier bridge conduction loss, different topologies have been developed, including the bridgeless boost PFC, which doesn't require range switching, and shows both simplicity and high performance. Without an input rectifier bridge, bridgeless PFC generates less conduction loss as compared with the conventional PFC.

Although the circuit structure is simple, locating the boost inductor in the AC side makes it difficult for the circuit to sense the AC line voltage and inductor current. Further, since the AC side inductor structure makes the output float with respect to the input line, the circuit suffers from high common mode noise.

As compared with the average current control mode, a one cycle control mode shows many benefits for the bridgeless PCF circuit, such as no multiplier requirement, no input voltage sensing requirement, and no inductor current sensing requirement. Therefore, one cycle control gives an attractive solution.

According to one aspect of the invention, the one cycle control technique is implemented in the bridgeless PFC. By using one cycle control, both the voltage sensing and current sensing issues of the bridgeless PFC circuit can be solved. The experimental results show both an efficiency improvement and a good power factor correction function. And the EMI results show that the circuit noise is controllable.

B. Bridgeless PFC Circuit

Figure 11:
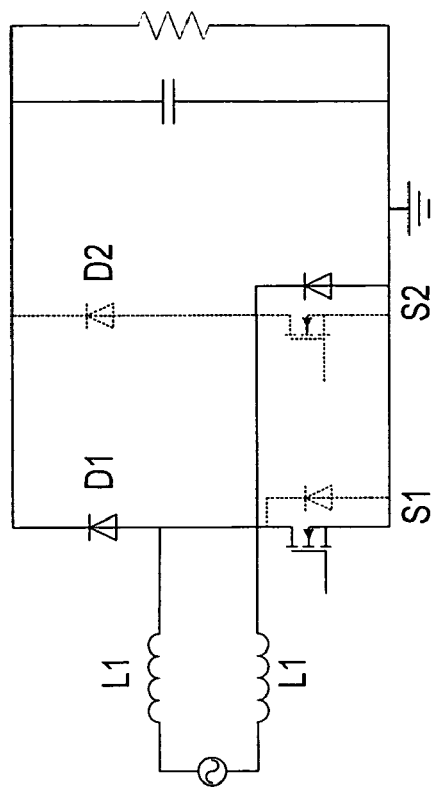
FIG. 11 shows an equivalent circuit corresponding to FIG. 10 for a positive line voltage cycle.
Figure 10:
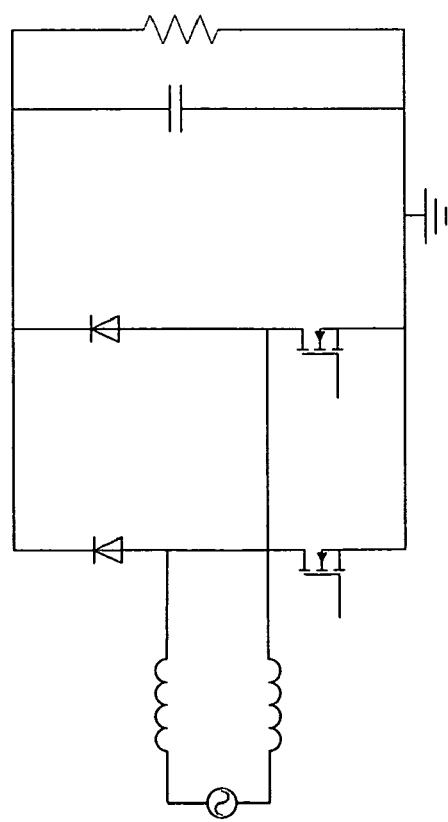
FIG. 10 shows a simplified bridgeless PFC circuit boost according to an embodiment of the invention.

The bridgeless PFC circuit is shown in FIG. 10. The boost inductor is split and located at the AC side to construct the boost structure. The equivalent circuit of positive half line (line voltage) cycle is shown in FIG. 11. In this half line cycle, MOSFET S1 and boost diode D1, together with the boost inductor L1, construct a boost DC/DC converter. Meanwhile, MOSFET S2 is operating by means of its body diode. The input current is controlled by the boost converter to follow the input voltage. During the negative half line cycle, circuit operation is analogous. Thus, in each half line cycle, one of the MOSFETs operates as the switch and the other one operates at least as a diode. Therefore, both the MOSFETs can be driven by the same signal.

The differences between the bridgeless PFC and conventional PFC are summarized in Table 1. Comparing the conduction path of these two circuits, at every moment, the bridgeless PFC inductor current only goes through two semiconductor devices, while the inductor current goes through three semiconductor devices in the conventional PFC circuit. As shown in Table 1, the bridgeless PFC uses one MOSFET body diode to replace the two slow diodes of the conventional PFC. Since both the circuits operate as a boost DC/DC converter, the switching loss should be the same. Thus the efficiency improvement relies on the conduction loss difference between the two slow diodes and the body diode of the MOSFET. In addition, as compared with the conventional PFC, the bridgeless PFC not only reduces conduction loss, but also reduces the total component count.

Figure 13:
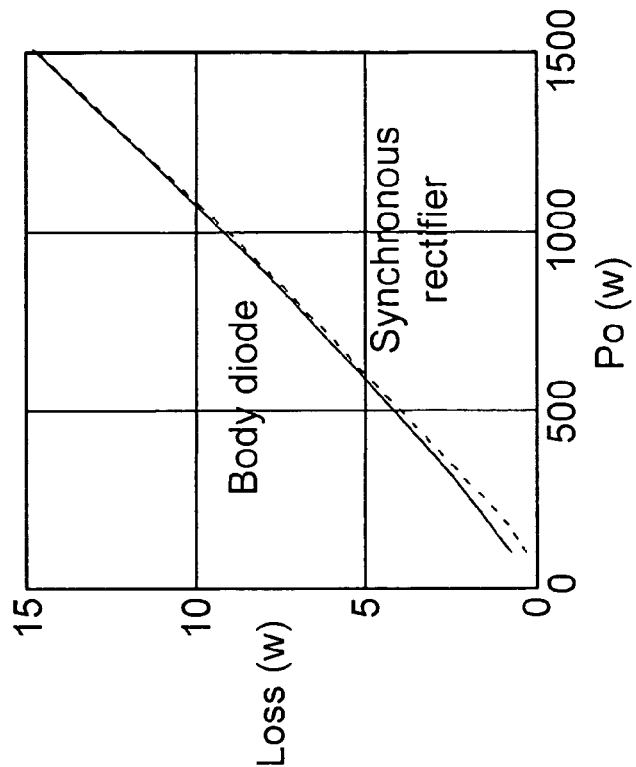
FIG. 13 shows a comparison between the conduction loss of the MOSFET body diode vs. the conduction loss in a synchronous rectifier.
Figure 12:
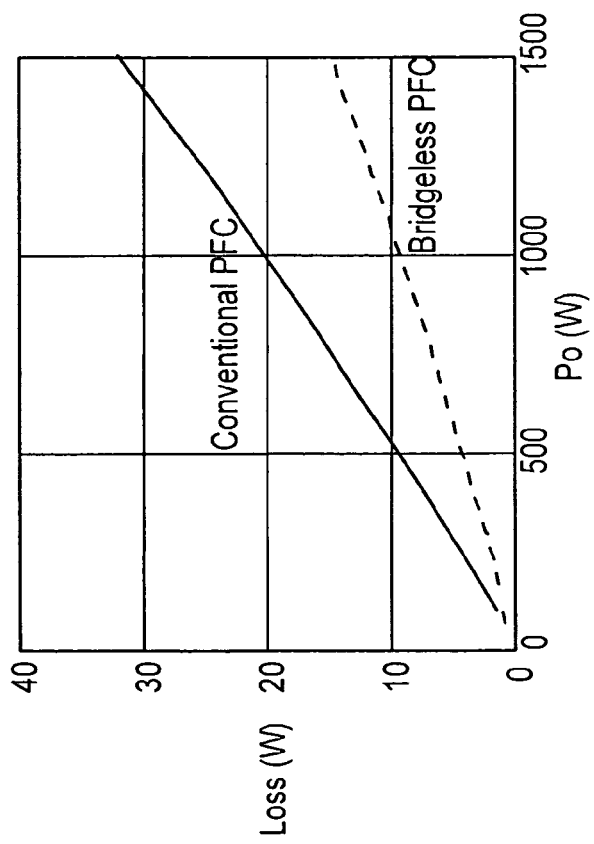
FIG. 12 shows conduction losses generated by a conventional PFC and a bridgeless PFC at 90V input and varying output power.

To estimate the efficiency improvement by using the bridgeless PFC circuit, the loss comparison is performed based on theoretical analysis. The MOSFET is chosen as the super junction MOSFET rated at 22 A, 600V and the diode bridge is chosen as GBPC2506W, rated at 25 A, 600V. Curve fitting method is used to generate the conduction loss model of these devices. Based on the inductor current instantaneous current, the conduction losses generated by these two devices at 90V input and varying output power are calculated as shown in FIG. 12. For the full power level range, the bridgeless PFC can improve the total efficiency at any power level by around 1%. Considering the small MOSFET on state resistance, turning on the MOSFET may further reduce the conduction loss in a synchronous rectifier. The conduction loss of the MOSFET is reevaluated based on the lower voltage drop caused by the MOSFET body diode and on state resistance. The calculation results are shown in FIG. 13. The power losses of these two cases are very similar. Although the synchronous rectifier has a slight improvement at low power, the improvement goes away when the MOSFET temperature rises, since the on state resistance is higher with higher temperature. Considering the complexity of the synchronous rectifier, it shouldn't be implemented.

C. Advantages of Bridgeless PFC Circuit

As shown in FIG. 10, the bridgeless PFC circuit doesn't have an input diode bridge, and the boost inductor is located at the AC side. Since the output and input of the circuit have no direct connection, the bridgeless circuit has several issues to be addressed, such as input voltage sensing, current sensing and EMI noise.

The voltage sensing and current sensing issues are related to the control of the bridgeless PFC circuit. For the conventional PFC circuit, control methods of several kinds have been developed, such as the average current mode control, peak current mode control, and one cycle control.

The average current mode control is the most popular control method because of its high performance and ease of understanding. The controller multiplies the input voltage signal with the voltage loop output voltage to generate a current reference; and the current loop controls the inductor average current to follow the current reference.

As for the one cycle control, the controller uses the voltage loop output voltage and inductor peak current to calculate the duty cycle of each switching cycle. Since the duty cycle meets the requirement of the boost circuit input and output voltage relationship, the inductor current peak current automatically follows the input voltage shape. Thus the power factor correction function is achieved.

1. Input Voltage Sensing

Figure 14:
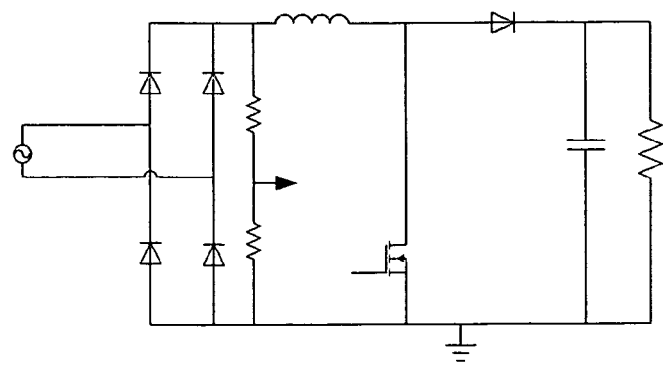
FIG. 14 shows input voltage sensing using a voltage divider in a conventional PFC.
Figure 15:
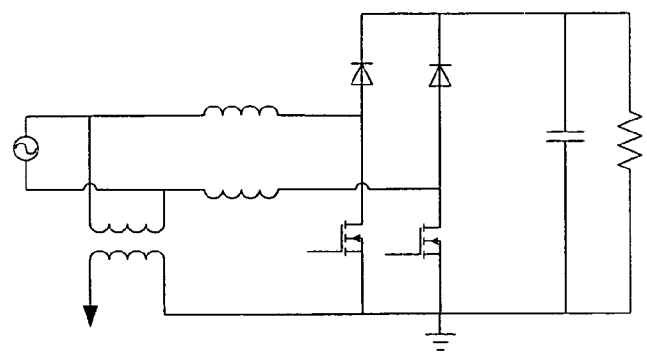
FIG. 15 shows a 60 Hz transformer used for voltage sensing.
Figure 16:
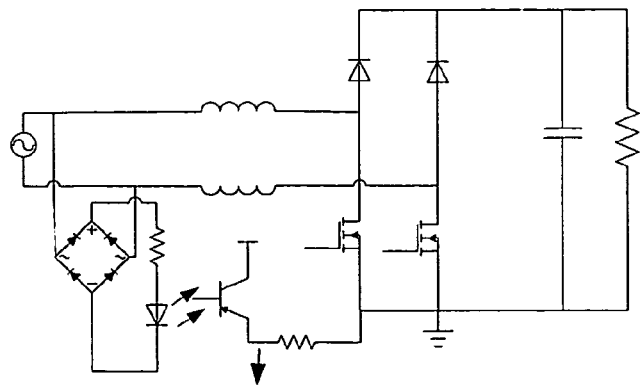
FIG. 16 shows an optical coupler used for voltage sensing.

For the conventional PFC, input voltage sensing is simple. Because of the existence of the rectifier bridge, the rectified input voltage can be directly sensed by using a voltage divider, as shown in FIG. 14. For the bridgeless PFC, there is no rectifier bridge, and no place to use a voltage divider to sense the input voltage. A 60 Hz transformer is a simple solution for the voltage sensing, as shown in FIG. 15. Due to the larger size of the low frequency transformer and the cost issue, it is unacceptable for kilowatt range power supplies. An optical coupler is a good candidate for the voltage sensing, too, because it can easily achieve isolation, as shown in FIG. 16. To achieve lower distortion of the voltage sensing, a higher linearity optical coupler with a wide operating range needs to be used, which is not practical and much more complex by comparison with the conventional voltage divider sensing.

For the average current mode control, the inductor current reference is generated based on the sensed input voltage. The input voltage sensing is necessary and will cause either higher cost or larger converter size. But for one cycle control, the peak inductor current works together with the voltage loop output, so no input voltage sensing is required.

For the conventional PFC circuit, the voltage sensing is simple, which makes the benefit of the one cycle control less obvious.

The complexities of input voltage sensing in the bridgeless PFC make the one cycle control a more attractive control method.

2. Current Sensing

Figure 17:
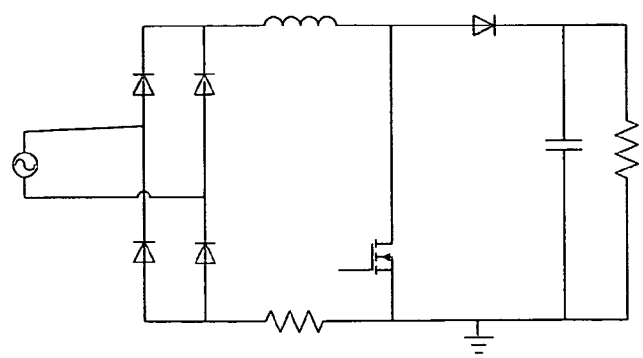
FIG. 17 shows inductor current sensing using a shunt resistor in a conventional PFC.

For the conventional PFC, inductor current sensing is quite simple. Simply by putting a shunt resistor in the return path of the inductor current, the inductor current can be sensed and with the common ground of the control, as shown in FIG. 17. There is no isolation requirement for the current sensing.

For the bridgeless PFC, the inductor return path doesn't share the same ground as the output. Therefore an isolated sensing method is used. As with voltage sensing, a 60 Hz current transformer will give a straightforward solution. However, since the low frequency transformer generates a large phase delay on the signal, the control input current will have a phase difference with the input voltage. Thus the power factor is decreased by the current sensing.

Figure 18:
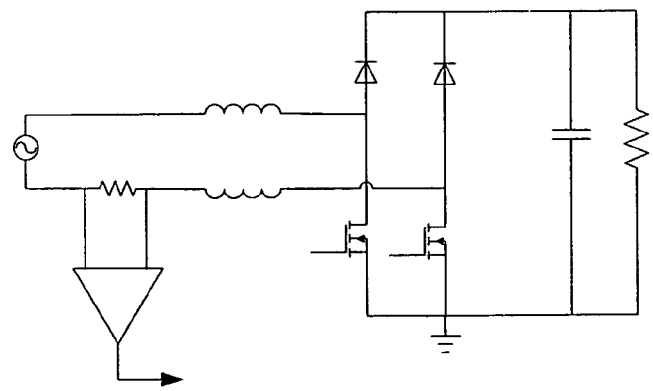
FIG. 18 shows current sensing using a differential mode amplifier.

Another isolation method is to use a differential mode amplifier, as shown in FIG. 18. Because of the PFC circuit switching at high switching frequency and high output voltage, the high common mode voltage will cause extra noise in the current signal. Since the current sensing voltage is low to minimize the power loss, the power factor may be hurt by the current sensing noise. Besides, the differential amplifier cost is much higher compared with the shunt resistor solution.

Figure 19:
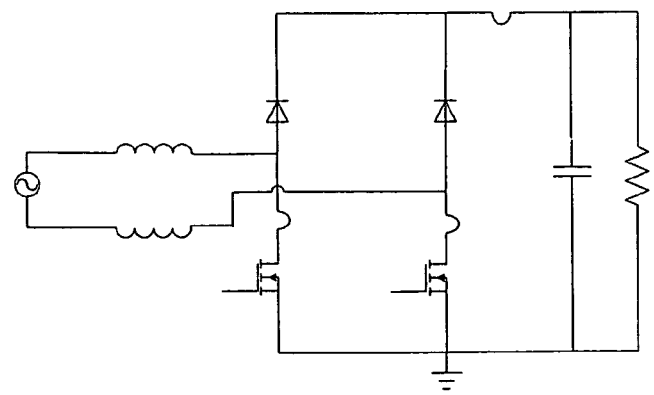
FIG. 19 shows current sensing in which the inductor current is reconstructed from the switch and diode currents.

Alternatively, the inductor current can be reconstructed from the switch and diode currents. See FIG. 19. Due to the different conduction path of the inductor current, three current transformers are required for the current sensing.

For average current mode control, inductor average current is required for the current loop. But for one cycle control, only the inductor peak current is required for the control. Therefore, the current sensing can be simplified. By using the series current transformers with MOSFETs, the inductor peak current can be easily sensed. Moreover, the use of current transformers can further reduce the power loss caused by a shunt resistor. As with voltage sensing, the simple current sensing method for the conventional PFC circuit makes the one cycle control less attractive. For bridgeless PFC, however, the complexity of current sensing makes one cycle control the most attractive control method.

3. EMI Noise

Figure 20:
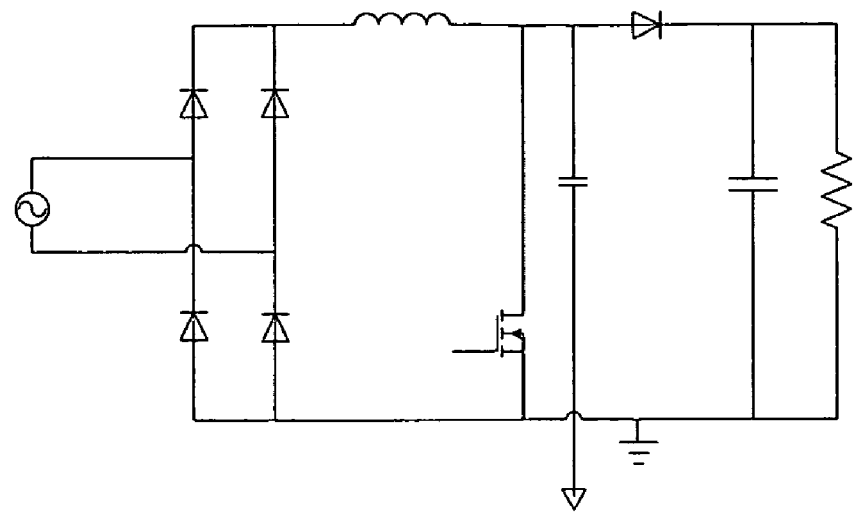
FIG. 20 shows a parasitic capacitor contributing to common mode noise in a conventional PFC.
Figure 21:
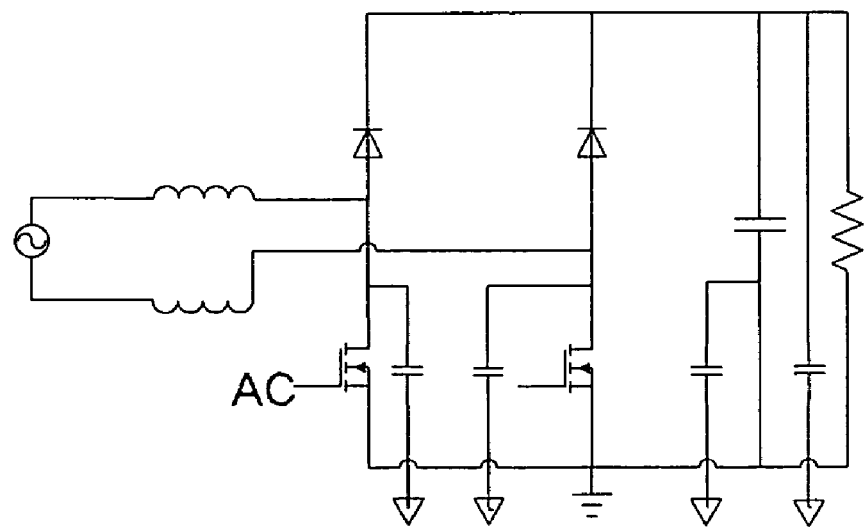
FIG. 21 shows parasitic capacitors that contribute to common mode noise in a bridgeless PFC.

EMI noise issues rely on the power stage structure. For the conventional PFC, the output voltage ground is always connected with the input line, through the rectifier bridge. Therefore, the only parasitic capacitor contributing to the common mode noise is the parasitic capacitor between the MOSFET drain to the earth ground, as shown in FIG. 20. For the bridgeless PFC, there is no existence of the rectifier bridge. The output voltage is floating regarding the input AC line. Thus, not only the parasitic capacitors between the MOSFET drains to the earth ground Cd1 and Cd2, but also all the parasitic capacitors between the output terminals to the earth ground Cn and Cp also contribute to the common mode noise, as shown in FIG. 21. The simulation results are shown in FIG. 22. The dv/dt on the parasitic capacitors between the MOSFET drains to the earth ground Vcd1 and Vcd2 are reverse polarity. By carefully designing the parasitic capacitances, noise cancellation can be achieved. As the dv/dt of the parasitic capacitors between the output terminals to the earth ground, Vp and Vn, are the same, there is no way to achieve noise cancellation. Considering these capacitors not only include the output of the PFC stage parasitics but also the input for the load, the common mode noise can be much worse as compared with the conventional PFC circuit.

D. Experimental Implementation

Based on the analysis above, the bridgeless PFC circuit can both simplify the circuit topology and improve the efficiency. Moreover, the one cycle control is the most attractive control method for the bridgeless PFC circuit. One 500W, 100 kHz switching frequency, universal line input bridgeless PFC circuit was designed and implemented with one cycle control. 600V 22 A super junction MOSFET and 600V 4 A SiC diode were used in the prototype. In addition, a conventional PFC circuit using same devices was built to serve as the benchmark.

The input voltage and current waveforms are shown in FIG. 23. The input current perfectly follows the input voltage. Thus the power factor correction function is achieved by using the one cycle controller. The efficiency comparison between these two circuits at 90V input line voltage is shown in FIG. 24. For the whole power range, efficiency improvement is around 1%, which is quite coincident with the theoretical analysis. The power factor at full output power and varying input line voltage is shown in FIG. 25. The high power factor is achieved by using one cycle control for the whole input line range. EMI performances of the bridgeless PFC and the conventional PFC circuit are compared, and the results are shown in FIG. 26 and FIG. 27. From the experimental results, the bridgeless PFC noise is similar to the conventional PFC circuit noise in the low frequency range. Although the noise is slightly higher in the high frequency range, the EMI noise of the bridgeless PFC circuit is controllable.

E. Summary

The bridgeless PFC circuit removes the input rectifier and is able to achieve higher efficiency. Based on the theoretical analysis, 1% efficiency improvement is expected from the circuit. The circuit copes with voltage sensing and current sensing issues, and the one cycle control gives a simple and high performance solution. The experimental results show the simplicity of the one cycle control and high power factor, and further, verify that the bridgeless PFC can improve efficiency by 1% compared with the conventional PFC circuit. Although the bridgeless PFC circuit still has EMI noise, the noise is controllable and similar to the conventional PFC circuit EMI.

III. Proposed One Cycle Control PFC IC

Following is a description of a proposed OCC chip for use in the foregoing embodiments of the invention.

A. Features:

PFC with "One Cycle Control"
Continuous Conduction Mode Boost Type PFC
No Line Voltage Sense Required
Programmable Switching Frequency (50 kHz–200 kHz)
Programmable Overvoltage Protection
Brownout Protection
Cycle by Cycle Peak Current Limit
Soft Start
User initiated micropower "Sleep Mode"
Open Loop Protection
Maximum duty cycle limit of 98%
User programmable fixed frequency operation
Min off time of 150–350 nS over freq range
VCC Under Voltage Lockout
Output undervoltage shutdown
18V gate drive capable of 1.5 A peak Micropower startup (<200 µA)
Latch immunity and ESD protection

B. Description

The proposed power factor correction (PFC) control IC is designed to operate in continuous conduction mode (CCM) over a wide range of input line voltage. The IC is based the "One Cycle Control" (OCC) technique providing a cost effective solution for power factor correction. The control method allows major reductions in component count, PCB area and design time while delivering better system performance than traditional solutions. The IC is fully protected and eliminates the often noise sensitive line voltage sensing requirements of existing solutions.

Its features include programmable switching frequency, programmable dedicated over voltage protection, soft start, cycle-by-cycle peak current limit, brownout, open loop, UVLO and micropower startup current. In addition, for low standby power requirements (Energy Star, Green Power, Blue Angel, etc.), the IC can be driven into sleep mode with total current consumption below 200 µA, by pulling the OVP pin below 1V.

FIG. 28 is a block diagram showing an application of the proposed IC. In this example it is used in a rectifier-type PFC circuit of type shown in FIG. 1.

FIG. 29 is a block diagram of the IC.

FIG. 30 is a chart showing the lead assignments and definitions.

The package is advantageously an 8-Lead SOIC.

C. Pin Definitions

Pin COM (Ground)

This is ground potential pin of the integrated control circuit. All internal devices are referenced to this point.

Pin VFB (Output voltage feedback)

The output voltage of the boost converter is sensed via a resistive divider and fed into this pin, which is the inverting input of the output voltage error amplifier. The impedance of the divider string must be low enough so as to not introduce substantial error due to the input bias currents of the amplifier, yet low enough so as to minimize power dissipation. Typical value of external divider impedance will be 1M Ω. The error amplifier is a trans conductance type, which yields high output impedance, thus increasing noise immunity of the error amplifier output in addition to eliminating input divider string interaction with compensation feedback capacitors and reducing loading of divider string due to a low impedance output of the amplifier.

Pin COMP (Voltage Amplifier Output)

External circuitry from this pin to ground compensates the system voltage loop. This compensation will be designed by the system designer and dictated by system specifications. This is the output of the voltage error amplifier and the compensation network will dictate the soft start time. This pin may also be utilized to provide a shut down feature of the converter by pulling pin to ground via external circuitry.

Pin GATE

This is the gate drive output of the IC. This drive voltage is internally limited to a maximum of 18V and provides a drive current of +1.5 A peak with matched rise and fall times.

Pin FREQ

This is the user programmable frequency pin. An external resistor from this pin to the COM pin programs the frequency. The operational switching frequency range for the device is 50 kHz–200 kHz Pin ISNS (Current Sense Input)

This pin is the inverting Current Sense Input & Peak Current Limit. The voltage at this pin is the negative voltage drop, sensed across the system current sense resistor, representing the average inductor current, which is amplified by the current sense amplifier. At the instant this voltage reaches the reference voltage, the drive pulse is terminated, thus providing "cycle by cycle" protection. The drive pulses will be reset on the next clock cycle provided the voltage at the comparator input has decayed below the threshold. This protection circuit incorporates a leading edge blanking circuit following the comparator to improve noise immunity of the protection process. The output of the current sense amplifier is also fed into the inverting input of the summing amplifier which sums the output voltage error amplifier output with this voltage, the output of which then provides a voltage representative of the equation: $V_m - k \cdot I_S \cdot R_S$ Where: Vm=error amplifier output voltage
$I_S$=average inductor current
$R_S$=system current sense resistor Pin VCC This is the supply voltage pin of the IC. This pin is the sensed node for the under voltage lock out circuit. It is possible to turn off the IC by pulling this pin below the minimum turn off threshold voltage, without damage to the IC. This pin is not internally clamped.

Pin OVP

This pin is the input to the over voltage protection comparator the threshold of which is internally programmed to 106% of VREF, which corresponds to a threshold of 106% of the normal output voltage. A resistive divider feeds this pin from the output voltage to COM and inhibits the gate drive whenever the threshold is exceeded. Normal operation resumes at such time as the voltage level on this pin decreases to below the pin threshold, (with hysteresis). This pin is also used to activate the IC "sleep" mode by pulling the voltage level below 0.5V (typ).

D. States Of Operation

FIG. 31 is a flow diagram showing the states of operation and the transitions therebetween. In more detail:

UVLO Mode

As AC line voltage increases from 0 volts the IC remains in the UVLO condition until such time as the voltage on the VCC pin exceeds the VCC turn on threshold voltage, VCC ON. During the time the IC remains in the UVLO state, the gate drive circuit is inactive and the IC draws a quiescent current of ICC STNDBY. The UVLO mode is accessible from any other state of operation whenever the IC supply voltage condition of, VCC<VCC UVLO, is satisfied. See FIG. 32 for a timing diagram of the Vcc UVLO mode.

Standby Mode

The IC is in this state if the supply voltage has exceeded VCC ON and the VFB pin voltage is less than 20% of VREF. The oscillator is running and all internal circuitry is biased in this state, but the gate is inactive and the IC draws ICC STNDBY. This state is accessible from any other state of operation except OVP. This IC enters this state whenever the VFB pin voltage has decreased to 50% of VREF when operating in normal mode or during a peak current limit fault condition, or 20% VREF when operating in soft start mode. This is also the state of operation entered in the event of an over temperature fault condition.

Soft Start Mode

This state is activated once the VCC voltage has exceeded VCC ON and the VFB pin voltage has exceeded 20% of VREF. The soft start time, which is defined as the time required for the duty cycle to linearly increase from 0 to maximum, is dependent upon the values selected for compensation of the voltage loop, Pin COMP to COM. Throughout the soft start cycle, the output of the voltage error amplifier, (Pin COMP), charges through the compensation network. This forces a linear rise of the voltage at this node, which in turn forces a linear increase in the gate drive duty cycle from 0. This controlled duty cycle increase reduces system component stress during start up conditions as the input current amplitude is linearly increasing.

Normal Mode

The IC shall be deemed to be in normal operating mode once the soft start transition has been completed. At this point the gate drive is switching and the IC will draw a maximum of ICC AG from the supply voltage source. The device will initiate another soft start sequence in the event of a shutdown due to a fault, which activates the protection circuitry, or if the supply voltage drops below the UVLO turn off threshold of VCC UVLO.

Fault Protection Mode

The fault mode will be activated when any of the protection circuits are activated. The IC protection circuits include Supply Voltage Under Voltage Lockout (UVLO), Output Over Voltage Protection (OVP), Open Loop Protection (OLP), Output Undervoltage Protection (OUV), and Peak Current Limit Protection (IPK LIMIT).

See FIG. 33 for a timing diagram of the OLP, Soft Start, Normal, OVP, Standby and OUP modes.

Sleep Mode

The sleep mode is initiated by pulling the OVP pin below 0.7V (typ). In this mode the IC is essentially shut down and draws a very low quiescent supply current.

E. General Description

The Control IC is intended for boost converters for power factor correction operating at a fixed frequency in continuous conduction mode. The IC operates with essentially two loops, an inner current loop and an outer voltage loop. The inner current loop is fast and reliable and does not require sensing of the input voltage in order to create a current reference. This inner current loop sustains the sinusoidal profile of the average input current based on the dependency of the pulse width modulator duty cycle on the input line voltage, to determine the analogous input line current. Thus, the current loop exploits the embedded input voltage signal to command the average input current following the input voltage. This is true so long as operation in continuous conduction mode is maintained. There may be some amount of distortion of the current waveform as the line cycle migrates toward the zero crossing and as the converter operates at very light loads given that the inductor has a finite inductance. The resultant harmonic currents under these operating conditions will be within the Class D specifications of EN61000-3-2, and therefore not an issue. The outer voltage loop controls the output voltage of the boost converter and the output voltage error amplifier produces a voltage at its output, which directly controls the slope of the integrator ramp, and therefore the amplitude of the average input current. The combination of the two control elements controls the amplitude and shape of the input current so as to be proportional to and in phase with the input voltage. The IC employs protection circuits providing for robust operation in the intended application and protection from system level over current, over voltage, under voltage, and brownout conditions.

IC Supply

The UVLO circuit monitors the VCC pin and maintains the gate drive signal inactive until such time as the VCC pin voltage reaches the UVLO turn on threshold, VCC ON. As soon as the VCC voltage exceeds this threshold, provided that the VFB pin voltage is greater than 20% VREF, the gate drive will begin switching under control of the Soft Start function, which will gradually allow the pulse width to increase toward its maximum value as demanded by the output voltage error amplifier. In the event that the voltage at the VCC pin should drop below that of the UVLO turn off threshold, VCC UVLO, the IC then turns off, gate drive is terminated, and the turn on threshold must again be exceeded in order to re start the process and move into Soft Start mode.

Soft Start

The soft start process controls the rate of rise of the output voltage error amplifier in order to obtain a linear control of the increasing duty cycle as a function of time. The soft start time is essentially controlled by voltage error amplifier compensation components selected, and is therefore user programmable to some degree based on desired loop crossover frequency.

Frequency Select

The oscillator is designed such that the switching frequency of the IC is programmable by an external resistor at the FREQ pin. The design incorporates min/max restrictions such that the minimum and maximum operating frequency fall within the range of 50–200 kHz, based on the resistor value selected.

Gate Drive

The gate drive output may be a totem pole driver with sufficient drive capability to efficiently drive power switch typical of the application, (i.e. IRFB22N60C3 or equivalent).

Although the present invention has been described in relation to particular embodiments thereof, many other variations and modifications and other uses will become apparent to those skilled in the art. Therefore, the present invention is not limited by the specific disclosure herein.

TABLE 1

DIFFERENCE BETWEEN CONVENTIONAL PFC AND BRIDGELESS PFC

| | SLOW DIODE | FAST DIODE | MOSFET | CONDUCTION PATH |
|---|---|---|---|---|
| CONVENTIONAL PFC | 4 | 1 | 1 | 2 SLOW DIODE, 1MOSFET/(2 SLOW DIODE, 1 FAST DIODE) |
| BRIDGELESS PFC | 0 | 2 | 2 | 1MOSFET BODY DIODE, 1MOSFET/ (1MOSFET BODY DIODE, 1 DIODE) |

What is claimed is:

1. A bridgeless PFC boost converter comprising:
a boost inductor having a first end connected to a first AC input terminal and a second end connected to a first junction defined between the anode of a first diode and a first terminal of a first switch;
a second terminal of the first switch connected to a common line;

a parallel circuit of a capacitance and a load connected between the cathode of the first diode and the common line;
a series circuit of a second diode and a second switch connected between the cathode of the first diode and the common line;
a second AC input terminal connected to a second junction defined between the anode of the second diode and the second switch; and
a control integrated circuit connected for controlling the first and second switches so as to provide power factor correction with respect to power applied to said load
wherein said first and second switches are MOSFETs, each having a respective body diode whose cathode is connected to the corresponding one of said first and second junction points,
wherein said control integrated circuit implements single cycle control wherein said first and second switches are controlled in response to current in said first and second switches and said first and second diodes, said control integrated circuit having as a first input an output of a current sense amplifier having an input comprising a sum of said currents in said first and second switches and said control integrated circuit further having as a second input an output of an error amplifier sensing an output voltage of said converter, said control integrated circuit having outputs coupled to control terminals of each of said first and second switches to implement said power factor correction.

2. A bridgeless PFC boost converter comprising:
a boost inductor having a first end connected to a first AC input terminal and a second end connected to a first junction defined between the anode of a first diode and a first terminal of a first switch;
a second terminal of the first switch connected to a common line;
a parallel circuit of a capacitance and a load connected between the cathode of the first diode and the common line;
a series circuit of a second diode and a second switch connected between the cathode of the first diode and the common line;
a second AC input terminal connected to a second junction defined between the anode of the second diode and the second switch; and
a control integrated circuit connected for controlling the first and second switches so as to provide power factor correction with respect to power applied to said load,
wherein said first and second switches are MOSFETs, each having a respective body diode whose cathode is connected to the corresponding one of said first and second junction points,
wherein said control integrated circuit implements single cycle control wherein said first and second switches are controlled in response to current in said first and second switches and to an output voltage across said load, said control integrated circuit having as a first input an output of a current sense amplifier having an input comprising a sum of said currents in said first and second switches and said control integrated circuit further having as a second input an output of an error amplifier sensing an output voltage of said converter, said control integrated circuit having outputs coupled to control terminals of each of said first and second switches to implement said power factor correction.

3. A bridgeless PFC boost converter comprising:
a boost inductor having a first end connected to a first AC input terminal and a second end connected to a first junction defined between the anode of a first diode and a first terminal of a first switch;
a second terminal of the first switch connected to a common line;
a parallel circuit of a capacitance and a load connected between the cathode of the first diode and the common line;
a series circuit of a second diode and a second switch connected between the cathode of the first diode and the common line;
a second AC input terminal connected to a second junction defined between the anode of the second diode and the second switch; and
a control integrated circuit connected for controlling the first and second switches so as to provide power factor correction with respect to power applied to said load,
wherein said first and second switches are MOSFETs, each having a respective body diode whose cathode is connected to the corresponding one of said first and second junction points,
wherein said control integrated circuit implements single cycle control wherein said first and second switches are controlled in response to an output voltage across said load and to peak current in said boost inductor, said control integrated circuit having as a first input an output of a current sense amplifier having an input comprising a sum of said currents in said first and second switches and said control integrated circuit further having as a second input an output of an error amplifier sensing an output voltage of said converter, said control integrated circuit having outputs coupled to control terminals of each of said first and second switches to implement said power factor correction.

4. A bridgeless PFC boost converter comprising:
a boost inductor having a first end connected to a first AC input terminal and a second end connected to a first junction defined between the anode of a first diode and a first terminal of a first switch;
a second terminal of the first switch connected to a common line;
a parallel circuit of a capacitance and a load connected between the cathode of the first diode and the common line;
a series circuit of a second diode and a second switch connected between the cathode of the first diode and the common line;
a second AC input terminal connected to a second junction defined between the anode of the second diode and the second switch; and
a control integrated circuit connected for controlling the first and second switches so as to provide power factor correction with respect to power applied to said load,
wherein said control integrated circuit implements single cycle control wherein said first and second switches are controlled in response to current in said first and second switches and said first and second diodes, said control integrated circuit having as a first input an output of a current sense amplifier having an input comprising a sum of said currents in said first and second switches and said control integrated circuit further having as a second input an output of an error amplifier sensing an output voltage of said converter, said control integrated circuit having outputs coupled to control terminals of each of said first and second switches to implement said power factor correction.

5. A bridgeless PFC boost converter comprising:

a boost inductor having a first end connected to a first AC input terminal and a second end connected to a first junction defined between the anode of a first diode and a first terminal of a first switch;

a second terminal of the first switch connected to a common line;

a parallel circuit of a capacitance and a load connected between the cathode of the first diode and the common line;

a series circuit of a second diode and a second switch connected between the cathode of the first diode and the common line;

a second AC input terminal connected to a second junction defined between the anode of the second diode and the second switch; and a control integrated circuit connected for controlling the first and second switches so as to provide power factor correction with respect to power applied to said load, wherein said control integrated circuit implements single cycle control wherein said first and second switches are controlled in response to current in said first and second switches and to an output voltage across said load, said control integrated circuit having as a first input an output of a current sense amplifier having an input comprising a sum of said currents in said first and second switches and said control integrated circuit further having as a second input an output of an error amplifier sensing an output voltage of said converter, said control integrated circuit having outputs coupled to control terminals of each of said first and second switches to implement said power factor correction.

6. A bridgeless PFC boost converter comprising:

a boost inductor having a first end connected to a first AC input terminal and a second end connected to a first junction defined between the anode of a first diode and a first terminal of a first switch;

a second terminal of the first switch connected to a common line;

a parallel circuit of a capacitance and a load connected between the cathode of the first diode and the common line;

a series circuit of a second diode and a second switch connected between the cathode of the first diode and the common line;

a second AC input terminal connected to a second junction defined between the anode of the second diode and the second switch; and a control integrated circuit connected for controlling the first and second switches so as to provide power factor correction with respect to power applied to said load, wherein said control integrated circuit implements single cycle control wherein said first and second switches are controlled in response to an output voltage across said load and to peak current in said boost inductor, said control integrated circuit having as a first input an output of a current sense amplifier having an input comprising a sum of said currents in said first and second switches and said control integrated circuit further having as a second input an output of an error amplifier sensing an output voltage of said converter, said control integrated circuit having outputs coupled to control terminals of each of said first and second switches to implement said power factor correction.

7. A bridgeless PFC boost converter according to claim 4, wherein said first and second switches are GaN devices.

8. A bridgeless PFC boost converter according to claim 5, wherein said first and second switches are GaN devices.

9. A bridgeless PFC boost converter according to claim 6, wherein said first and second switches are GaN devices.

* * * * *